(12) United States Patent
Igi et al.

(10) Patent No.: US 10,670,121 B2
(45) Date of Patent: Jun. 2, 2020

(54) SPEED REDUCER

(71) Applicant: NTN CORPORATION, Osaka (JP)

(72) Inventors: Taisuke Igi, Shizuoka (JP); Hirokazu Ooba, Shizuoka (JP); Takashi Nozaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/318,489

(22) PCT Filed: Jul. 10, 2017

(86) PCT No.: PCT/JP2017/025131
§ 371 (c)(1),
(2) Date: Jan. 17, 2019

(87) PCT Pub. No.: WO2018/025591
PCT Pub. Date: Feb. 8, 2018

(65) Prior Publication Data
US 2019/0285152 A1    Sep. 19, 2019

(30) Foreign Application Priority Data

Aug. 3, 2016  (JP) ................................. 2016-153106
Aug. 3, 2016  (JP) ................................. 2016-153109
Aug. 3, 2016  (JP) ................................. 2016-153111

(51) Int. Cl.
*F16H 25/06* (2006.01)

(52) U.S. Cl.
CPC ....... *F16H 25/06* (2013.01); *F16H 2025/063* (2013.01)

(58) Field of Classification Search
CPC ........................... F16H 25/06; F16H 2025/063
See application file for complete search history.

(56) References Cited

U.S. PATENT DOCUMENTS 4,829,851 A * 5/1989 Imase .................... F16H 25/06
                                              475/168
5,016,487 A   5/1991 Bollmann
(Continued)

FOREIGN PATENT DOCUMENTS

JP    60-168954    9/1985
JP    60-205058   10/1985
(Continued)

OTHER PUBLICATIONS

International Preliminary Report on Patentability dated Feb. 5, 2019 in International (PCT) Application No. PCT/JP2017/025131.
(Continued)

*Primary Examiner* — David M Fenstermacher
(74) *Attorney, Agent, or Firm* — Wenderoth, Lind & Ponack, L.L.P.

(57) ABSTRACT

The retainer is provided so as to be prevented from being rotatable with respect to the rotary shaft, and rotation of the input-side rotary member is reduced in speed and transmitted to the output-side rotary member through intermediation of the balls which engage with both of the ball engagement grooves. A raceway center line of the second ball engagement groove is formed of a wave-shaped curve. When a speed reduction ratio of the speed reducer is represented by "i", the wave-shaped curve has such a shape that the balls which engage with the first ball engagement groove engage with the second ball engagement groove at a given rotation angle ($\theta$) of the input-side rotary member in a state in which the output-side rotary member is at a rotation angle ($i\theta$).

12 Claims, 23 Drawing Sheets

(56) References Cited

U.S. PATENT DOCUMENTS

| | | | | |
|---|---|---|---|---|
| 5,286,236 A * | 2/1994 | Hosokawa | F16H 25/06 | 475/168 |
| 5,312,306 A * | 5/1994 | Folino | F16H 25/06 | 475/196 |
| 5,321,988 A * | 6/1994 | Folino | F16H 25/06 | 475/196 |
| 5,514,045 A * | 5/1996 | Folino | F16H 25/06 | 475/196 |
| 5,823,049 A * | 10/1998 | Schechter | F16H 25/06 | 74/25 |
| 5,904,073 A * | 5/1999 | Mimura | B60K 17/20 | 476/36 |
| 6,068,573 A * | 5/2000 | Folino | F16H 25/06 | 475/196 |
| 6,270,442 B1 * | 8/2001 | Folino | F16H 25/06 | 475/196 |
| 7,241,245 B2 * | 7/2007 | Stanovskoy | F16H 25/06 | 475/196 |
| 7,467,827 B2 * | 12/2008 | Bossmanns | B60N 2/2252 | 297/354.1 |
| 7,585,245 B2 * | 9/2009 | Schuler | F16H 13/06 | 475/166 |

FOREIGN PATENT DOCUMENTS

| | | |
|---|---|---|
| JP | 2-503709 | 11/1990 |
| JP | 05-203009 | 8/1993 |
| JP | 11-278084 | 10/1999 |
| JP | 2008-174213 | 7/2008 |

OTHER PUBLICATIONS

International Search Report dated Oct. 3, 2017 in International (PCT) Application No. PCT/JP2017/025131.

* cited by examiner

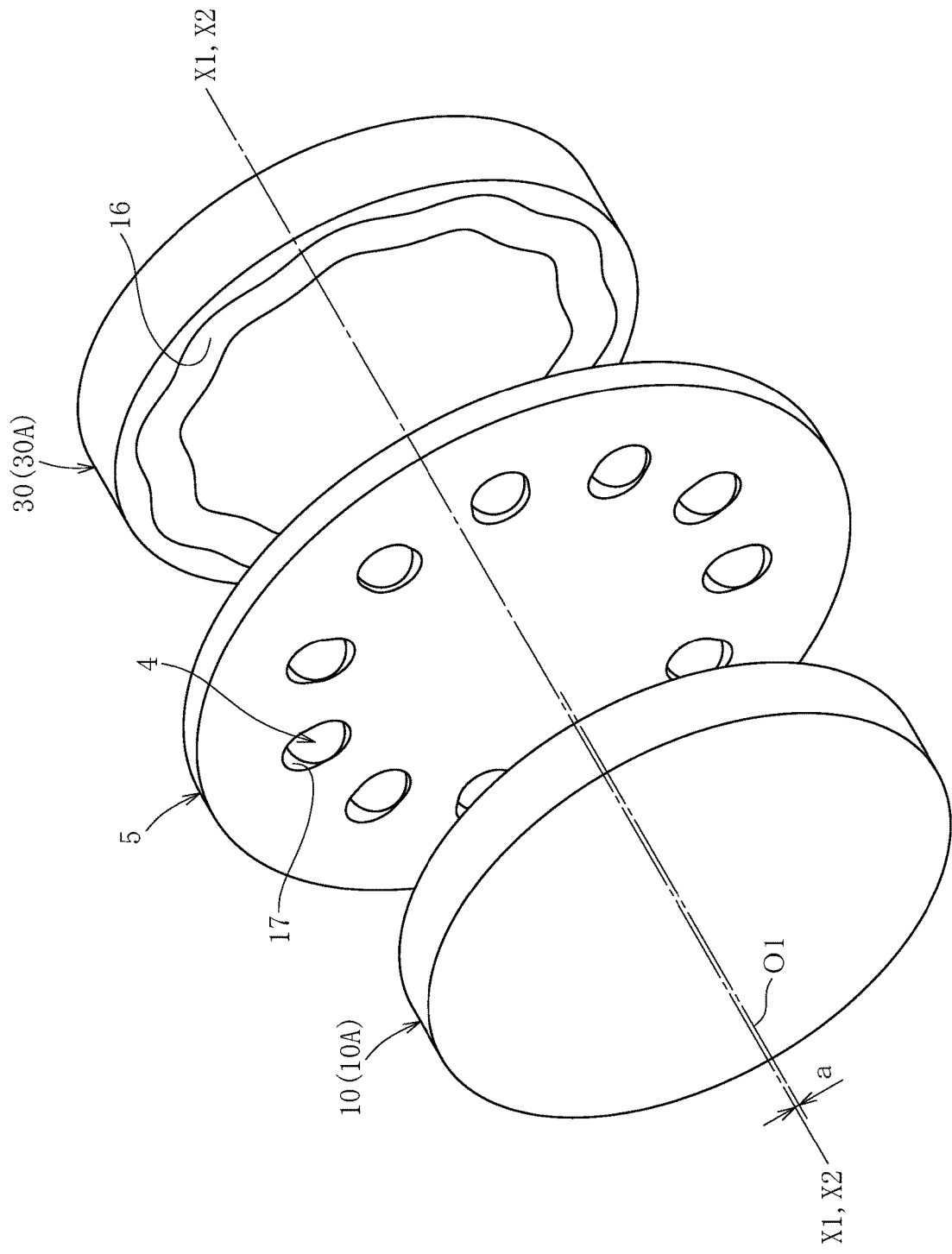

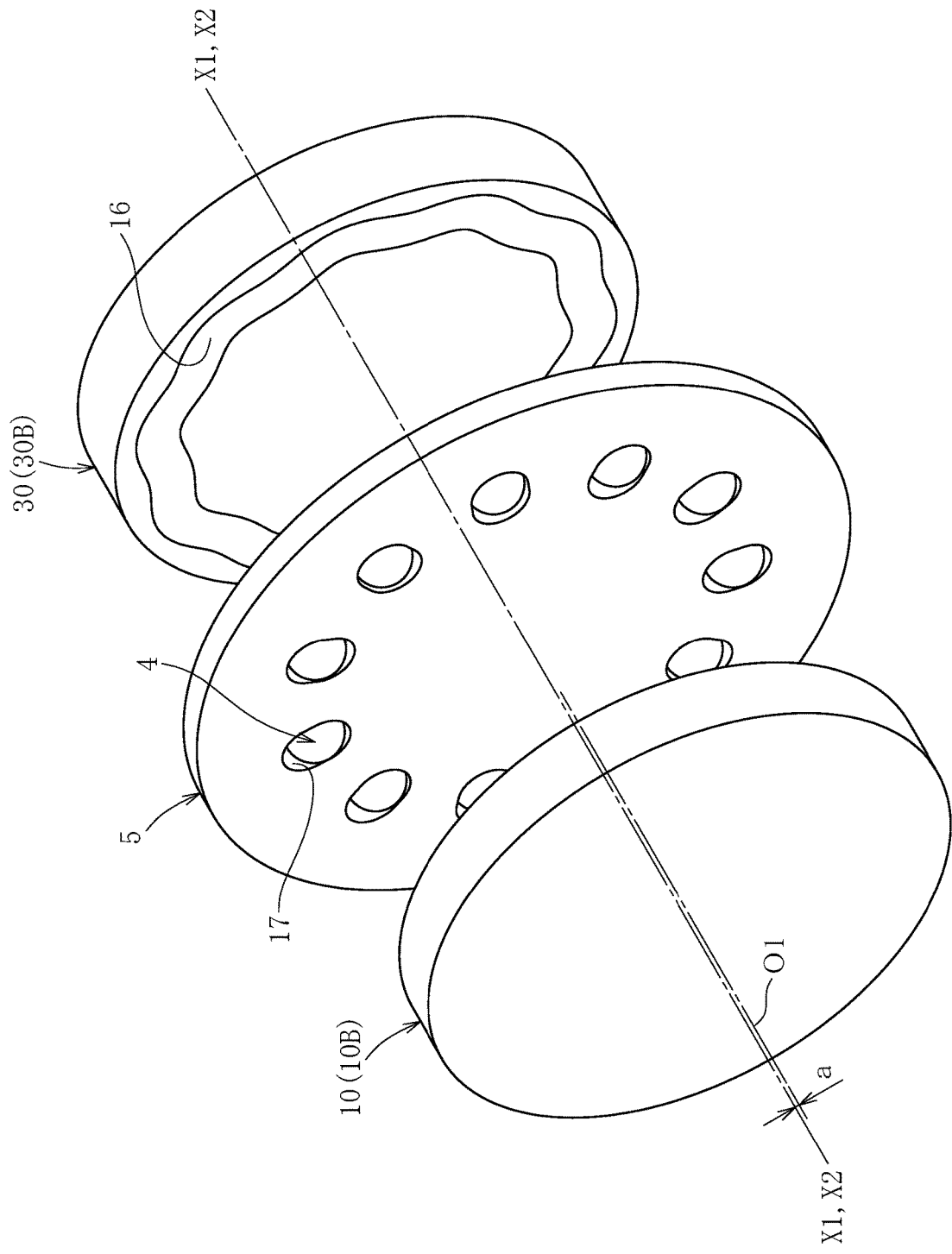

SPEED REDUCER

TECHNICAL FIELD

The present invention relates to a speed reducer.

BACKGROUND ART

There has already been proposed (for example, Patent Literature 1 and 2) a speed reducer including a first circular plate on an input side having a ball engagement groove, a second circular plate on an output side having a ball engagement groove, a plurality of balls which engage with the ball engagement grooves, and a retainer interposed between the first circular plate and the second circular plate, and configured to hold the balls. The speed reducer of this type is excellent in that, for example, a high speed reduction ratio and a small size is achieved.

The speed reducer proposed in Patent Literature 1 includes first and second circular plates each having a meandering first groove crossing a first reference circle on a plane at a constant pitch and a meandering second groove crossing a second reference circle on a plane at a constant pitch. The first circular plate and the second circular plate are opposed to each other through intermediation of first and second rolling elements respectively held by first and second retainers. The first retainer is fixed, and the second retainer is supported so as to be rotatable. It is described that this speed reducer is of a differential type. Thus, a high speed reduction ratio and a small size can be obtained.

A speed reducer proposed in Patent Literature 2 includes a drive cam, a driven cam, and a retainer. The drive cam has a circular cam groove which engages with balls, and is eccentric by a certain distance with respect to a rotary shaft. The driven cam has a cam groove having a shape of petals which engages with the balls. The retainer has grooves configured to hold the balls so that the balls are movable in a radial direction. The drive cam and the driven cam are arranged on both sides of the retainer while surfaces thereof having the cam grooves are opposed to each other, and are coupled to each other so as to be rotatable about the same axis. Rotation of the drive cam is reduced in speed through actions of the balls, and is transmitted to the driven cam. It is described that this speed reducer is small in size and is manufactured at low cost by relatively simple machining, and that a speed reduction ratio of approximately 6 can be obtained.

CITATION LIST

Patent Literature 1: JP 60-168954 A
Patent Literature 2: JP 05-203009 A

SUMMARY OF INVENTION

Technical Problem

In recent years, for example, a high rotation precision and vibration suppression are demanded for a speed reducer depending on usages and applications. In view of such demand, the inventors of the present invention focused on problems at a high level such as anon-constant velocity characteristic in a rotary motion between the input side and the output side of the speed reducer, fluctuation in rotation speed and occurrence of vibration on the output side caused by the non-constant velocity characteristic, and have concluded that a countermeasure for those problems is necessary. Even though, the speed reducers described in Patent Literature 1 and 2 are considered as excellent in such a point that the small size and the high speed reduction ratio can be achieved, no focus has been given on the problems such as the non-constant velocity characteristic of the rotary motion between the input side and the output side, and the fluctuation in rotation speed and the occurrence of the vibration on the output side caused by the non-constant velocity characteristic. Moreover, specific proposals have not been made for such problems in any other literatures. The present invention focuses on the problems.

The present invention has been made in view of the above-mentioned problems, and therefore has an object to provide a speed reducer which is capable of achieving a small size and a high speed reduction ratio, and capable of suppressing fluctuation in rotation speed and vibration on the output side.

Solution to Problem

According to one embodiment of the present invention, there is provided a speed reducer, comprising: an input-side rotary member comprising an input plate portion having a first ball engagement groove; an output-side rotary member, which is arranged coaxially with a rotary shaft of the input-side rotary member, and comprises an output plate portion having a second ball engagement groove; a plurality of balls, which engage with both of the ball engagement grooves of the input plate portion and the output plate portion opposed to each other in an axial direction; and a retainer comprising a plurality of pockets configured to hold the balls so that the balls are movable in a radial direction, wherein the retainer is provided so as to be prevented from being rotatable with respect to the rotary shaft, wherein rotation of the input-side rotary member is reduced in speed and transmitted to the output-side rotary member through intermediation of the balls which engage with both of the ball engagement grooves, wherein a raceway center line of the second ball engagement groove is formed of a wave-shaped curve, and wherein, when a speed reduction ratio of the speed reducer is represented by "i", the wave-shaped curve has such a shape that the balls which engage with the first ball engagement groove engage with the second ball engagement groove at a given rotation angle ($\theta$) of the input-side rotary member in a state in which the output-side rotary member is at a rotation angle ($i\theta$).

According to the embodiment of the present invention, the input side and the output side always rotate synchronously with each other. Moreover, for this configuration, the groove shapes only need to be determined, which does not lead to complexity in structure.

Centers of the balls which engage with the first ball engagement groove may be positioned on the raceway center line of the second ball engagement groove.

The first ball engagement groove of the input plate may comprise a circular groove having a center eccentric by a predetermined amount with respect to a speed-reducer rotation axis, or may have a polygonal cylindrical shape having a center eccentric with respect to the speed-reducer rotation axis by a predetermined amount and having as many sides as the number of the balls. Particularly, a synchronous rotation characteristic (constant velocity characteristic) between the input side and the output side can be improved by forming the groove on the input plate so as to have the polygonal cylindrical shape having as many sides as the number of the balls.

The input plate may be mounted so as to be rotatable on an eccentric portion, which is formed on the rotary shaft being an input shaft, through intermediation of a bearing, and a curvature center of the first ball engagement groove may be eccentric by a predetermined amount with respect to the speed-reducer rotation axis. Alternatively, an axial center of the input plate may be concentric with the rotary shaft being an input shaft, and a curvature center of the first ball engagement groove may be eccentric by a predetermined amount with respect to the axial center of the input plate. Therefore, a degree of freedom in design is increased for such a configuration that the curvature center of the first ball engagement groove is eccentric by the predetermined amount with respect to the speed-reducer rotation center, and ease of design for the speed reducer can be improved.

When the number of the balls is represented by "n", the number of peaks of the wave-shaped groove of the output plate is represented by "N", and the speed reduction ratio is represented by "i", i=(N−n)/N is satisfied. Therefore, a small size and a high speed reduction ratio can be achieved.

When an eccentric amount of the first ball engagement groove is represented by "a", a pitch circle radius of centers of the pockets is represented by "r", a rotation angle of the output plate is represented by ψ, and a speed reduction ratio is represented by "i", a center path of the wave-shaped groove of the output plate is represented by a distance R from the speed-reducer rotation axis, and the distance R satisfies the following Expression 1:

$$R = a \cdot \cos(\psi/i) + \sqrt{r^2 - (a \cdot \sin(\psi/i))^2} \quad \text{[Expression 1]}$$

where R represents a distance between axial center of rotary shaft and raceway center line of second ball engagement groove; a represents an eccentric amount; i represents a speed reduction ratio; ψ represents a rotation angle of output plate; and r represents a radius of raceway center line of first ball engagement groove.

A groove shape of the input plate comprises a polygonal cylindrical shape having as many sides as the number of the balls. A groove shape of the output shaft comprises a wave-shaped groove that rotates while a rotation angle of the output plate always maintains a speed reduction ratio to a rotation angle of the input plate. When a rotation angle of the input plate is represented by θ, a rotation angle of the output plate is represented by ψ, and a speed reduction ratio is represented by "i", i=ψ/θ is satisfied.

A synchronous rotation characteristic (constant velocity characteristic) between the input side and the output side can be improved by forming the groove on the input plate so as to have the polygonal cylindrical shape having as many sides as the number of the balls, as described above.

When an eccentric amount of the first ball engagement groove is represented by "a", a pitch circle radius of centers of the pockets is represented by "r", a rotation angle of the output plate is represented by ψ, and a speed reduction ratio is represented by "i", a center path of the wave-shaped groove of the output plate is represented by a distance R from the speed-reducer rotation axis, and the distance R satisfies the following Expression 2:

$$R = a \cdot \cos(\psi/i) + r \quad \text{[Expression 2]}$$

where R represents a distance between rotation center shaft (speed-reducer rotation axis) and balls; a represents an offset amount (eccentric amount) of center axis of input plate; r represents a pitch circle radius; ψ represents a rotation angle of output plate; and i represents a speed reduction ratio.

In this speed reducer, the balls arranged between the input plate and the output plate are constrained in the pockets of the retainer, and can move in one direction (radial direction). Therefore, a reference curve (raceway center line) of the wave-shaped groove of the output plate can be obtained by determining the distance R between the axial center of the rotary shaft and the ball center and deriving a relationship between the distance R and the rotation angle θ of the input plate.

It is preferred that at least one of a groove shape of the first ball engagement groove and a groove shape of the second ball engagement groove comprises a Gothic arch shape. With the ball engagement groove having the Gothic arch shape as described above, the balls can be arranged at stable positions in the groove having this shape.

The speed reducer further comprises a case configured to rotatably accommodate the input plate and the output plate, and fix the retainer. The input plate is externally fitted to the input shaft through a bearing, and the output plate is integrated with an output shaft axially supported by the case through intermediation of a bearing so as to be rotatable. With such configuration, a compact speed reducer can be formed.

A rotation restriction mechanism configured to restrict the rotation of the input plate and permit the revolution of the input shaft is provided between the input plate and a wall surface on a fixed side opposed to the input plate. When the rotation restriction mechanism is provided in such manner, a relative positional relationship between the groove of the input plate and the oblong-hole pockets of the retainer can be maintained, thereby being capable of stably preventing occurrence of the vibration.

Advantageous Effects of Invention

According to the one embodiment of the present invention, a speed reducer which is capable of achieving a small size and a high speed reduction ratio, and capable of suppressing fluctuation in rotation speed and vibration on the output side is provided.

BRIEF DESCRIPTION OF DRAWINGS

FIG. 3 is a perspective view for illustrating an input plate, a retainer, and an output plate of the speed reducer illustrated in FIG. 1.

FIG. 14 is a perspective view for illustrating an input plate, a retainer, and an output plate of the speed reducer illustrated in FIG. 12.

DESCRIPTION OF EMBODIMENTS

Figure 1:
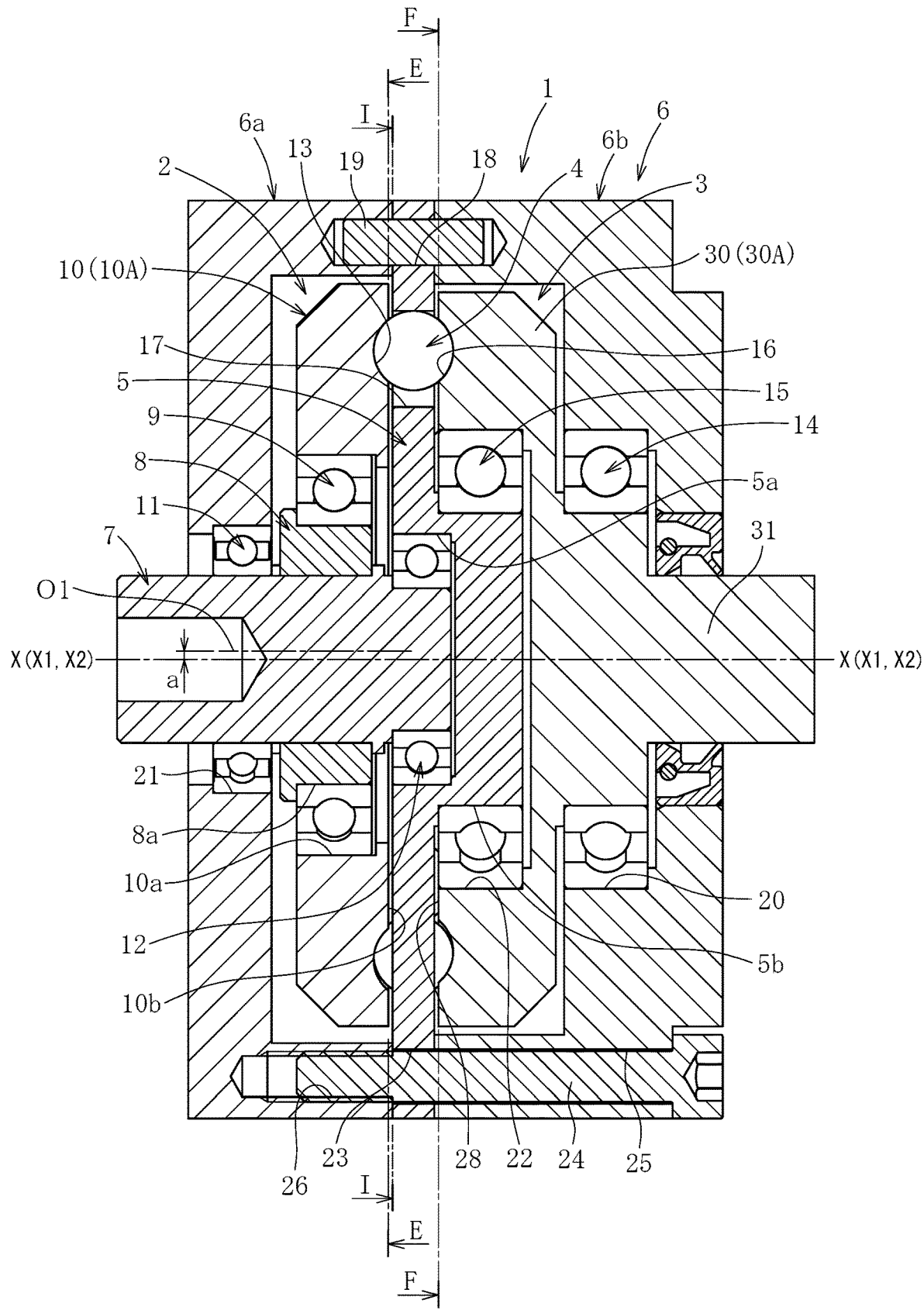
FIG. 1 is a sectional view for illustrating a speed reducer according to a first embodiment of the present invention.

FIG. 1 to FIG. 9 are views for illustrating a speed reducer according to a first embodiment. The speed reducer 1 mainly comprises an input-side rotary member 2, an output-side rotary member 3, balls 4, and a retainer 5. The speed reducer 1 is incorporated into a case 6 (case formed by a combination of a first member 6a on the input side and a second member 6b on the output side).

As illustrated in FIG. 1, the input-side rotary member 2 comprises a rotary shaft 7 being as an input shaft, an eccentric cam 8, a bearing 9, and an input plate 10 (10A). The eccentric cam 8 is fitted to a radially outer surface of the rotary shaft 7. A center line O1 of a cylindrical radially outer surface 8a of the eccentric cam 8 is eccentric in a radial direction by an eccentric amount "a" with respect to an axial center X1 (namely, a speed-reducer rotation center X) of the rotary shaft 7. Therefore, an eccentric portion is formed of the eccentric cam 8 on the rotary shaft 7 being the input shaft. The bearing 9 is mounted between the cylindrical radially outer surface 8a of the eccentric cam 8 and a cylindrical radially inner surface 10a of the input plate 10A, and the input plate 10A is supported so as to be rotatable by the eccentric cam 8. The center line O1 of the cylindrical radially outer surface 8a of the eccentric cam 8 serves also as a center line of the input plate 10A. Therefore, when the rotary shaft 7 rotates, the input plate 10A performs a revolution motion at a centrifugal whirling radius "a" about the center axis X1 of the rotary shaft 7. The rotary shaft 7 is supported so as to be rotatable by a bearing 11 mounted to a radially inner surface 21 of the first member 6a of the case 6 and a rolling bearing 12 mounted to a radially inner surface 5a of the retainer 5.

Figure 4A:
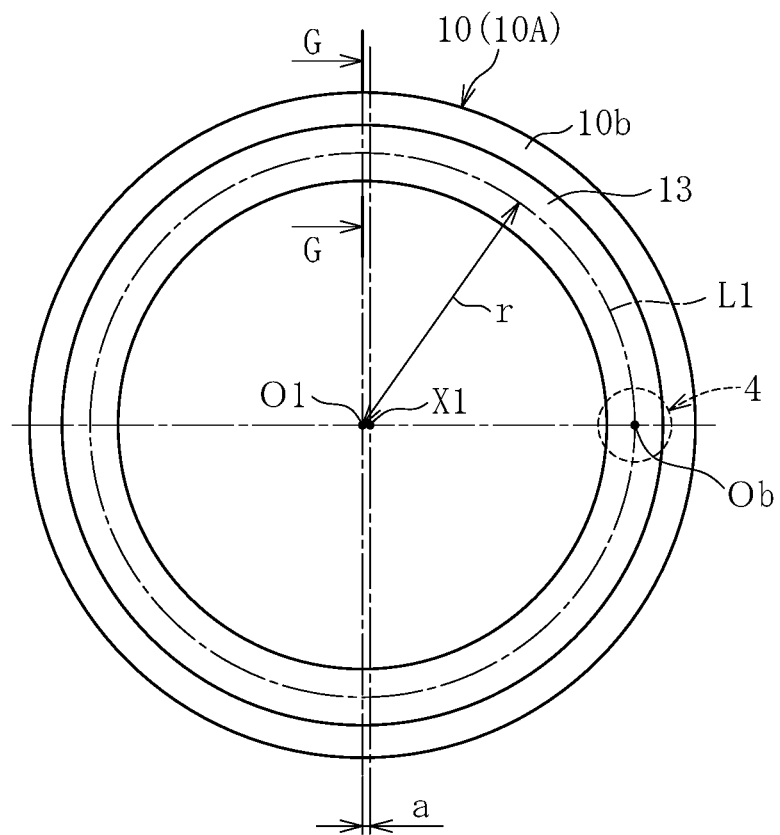
FIG. 4A is a side view for illustrating the input plate as seen in a direction indicated by the arrows of the line E-E of FIG. 1.
Figure 4B:
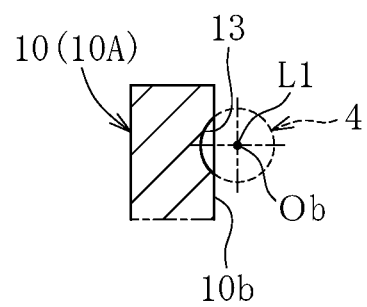
FIG. 4B is a sectional view for illustrating the input plate taken along the line G-G of FIG. 4A.

As illustrated in FIG. 1, FIG. 4A, and FIG. 4B, a first ball engagement groove 13 is formed in a side surface 10b of the input plate 10A. FIG. 4A is a side view for illustrating the input plate 10A as seen in a direction indicated by the arrows of the line E-E of FIG. 1. FIG. 4B is a sectional view for illustrating the input plate 10A taken along the line G-G of FIG. 4A. In FIG. 4A and FIG. 4B, a chamfer of a radially outer surface of the input plate 10A and the radially inner surface 10a (see FIG. 1) to which the bearing 9 is mounted are omitted.

As illustrated in FIG. 4A, a raceway center line L1 of the first ball engagement groove 13 is formed into a circular shape having a radius r. The first ball engagement groove 13 is formed of a part of a torus surface. A curvature center of the raceway center line L1 is positioned at the center line O1 of the cylindrical radially outer surface 8a of the eccentric cam 8 and the input plate 10A. The curvature center O1 is eccentric by the eccentric amount "a" with respect to the axial center X1 of the rotary shaft 7. A center Ob of the ball 4 is positioned on the raceway center line L1 of the first ball engagement groove 13. In Description and Claims, the raceway center line of the first ball engagement groove corresponds to a path of the center Ob of the ball 4 when the ball 4 moves along the first ball engagement groove 13.

As illustrated in FIG. 1, the output-side rotary member 3 comprises an output plate 30 (30A) and a shaft 31. The output plate 30A and the shaft 31 are integrally formed. The shaft 31 serves as an output shaft. The output-side rotary member 3 is supported so as to be rotatable by a bearing 14 mounted to a radially inner surface 20 of the case 6 and by a bearing 15 mounted to a radially stepped outer surface 5b of the retainer 5.

Figure 5A:
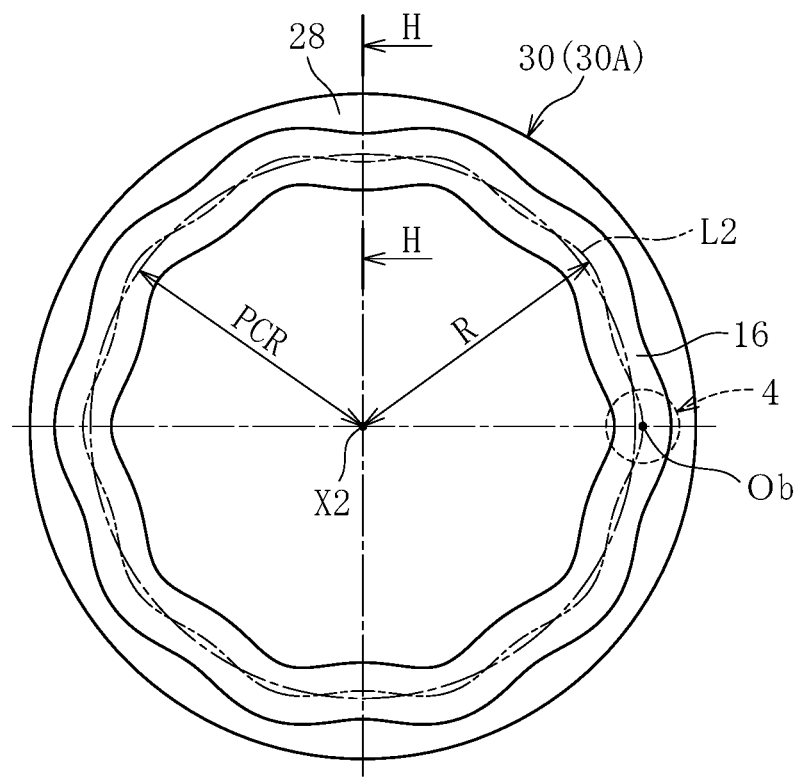
FIG. 5A is a side view for illustrating the output plate as seen in a direction indicated by the arrows of the line F-F of FIG. 1.
Figure 5B:
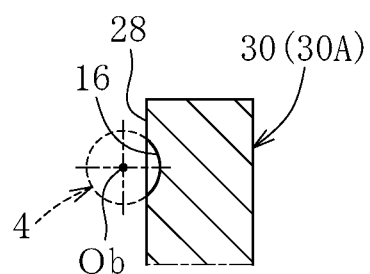
FIG. 5B is a sectional view for illustrating the output plate taken along the line H-H of FIG. 5A.

As illustrated in FIG. 1, FIG. 5A, and FIG. 5B, a second ball engagement groove 16 is formed in a side surface 28 of the output plate 30A. FIG. 5A is a side view for illustrating the output plate 30A as seen in a direction indicated by the arrows of the line F-F of FIG. 1. FIG. 5B is a sectional view for illustrating the output plate 30A taken along the line H-H of FIG. 5A. In FIG. 5A and FIG. 5B, a chamfer of a radially outer surface of the output plate 30A and the radially inner surface 22 (see FIG. 1) to which the bearing 15 is mounted are omitted.

A raceway center line L2 of the second ball engagement groove 16 is formed of a wave-shaped curve. A distance R between an axial center X2 of the shaft 31 and the raceway center line L2 fluctuates to increase and decrease with respect to a reference pitch circle radius PCR. In this embodiment, on the wave-shaped curve of the raceway center line L2, ten crests having the distance R larger than the reference pitch circle radius PCR and ten troughs having the distance R smaller than the reference pitch circle radius PCR are formed. The axial center X2 of the shaft 31 is arranged coaxially with the axial center X1 of the rotary shaft 7. The center Ob of the ball 4 is positioned on the raceway center line L2 of the second ball engagement groove 16.

In the first embodiment, the wave-shaped curve of the raceway center line of the second ball engagement groove corresponds to a curve alternately crossing the reference pitch circle having the radius PCR at a constant pitch. Moreover, the raceway center line of the second ball engagement groove corresponds to a path of the center Ob of the ball 4 when the ball 4 moves along the second ball engagement groove 16. The wave-shaped curve of the raceway center line L2 of the second ball engagement groove 16 is described later in detail.

As illustrated in FIG. 1, the retainer 5 is arranged between side surfaces 10b and 28 of the input plate 10A and the output plate 30A which are opposed to each other in an axial direction. Pockets 17 configured to hold the balls 4 are formed in the retainer 5. Through holes 18 are formed on an outer periphery side of the retainer 5. Pins 19 are inserted through insertion to the through hole 18 so that the retainer 5 is mounted to the case 6 so as to be prevented from being rotatable. As a result, the retainer 5 is prevented from being rotatable with respect to the rotary shaft 7 of the input-side rotary member 2. In this state, fixing bolts 24 are inserted through through holes 25 of the second member 6b and through holes 23 of the retainer 5, and are threadedly engaged with threaded holes 26 of the first member 6a, thereby fastening the first member 6a, the second member 6b, and the retainer 5.

Figure 6A:
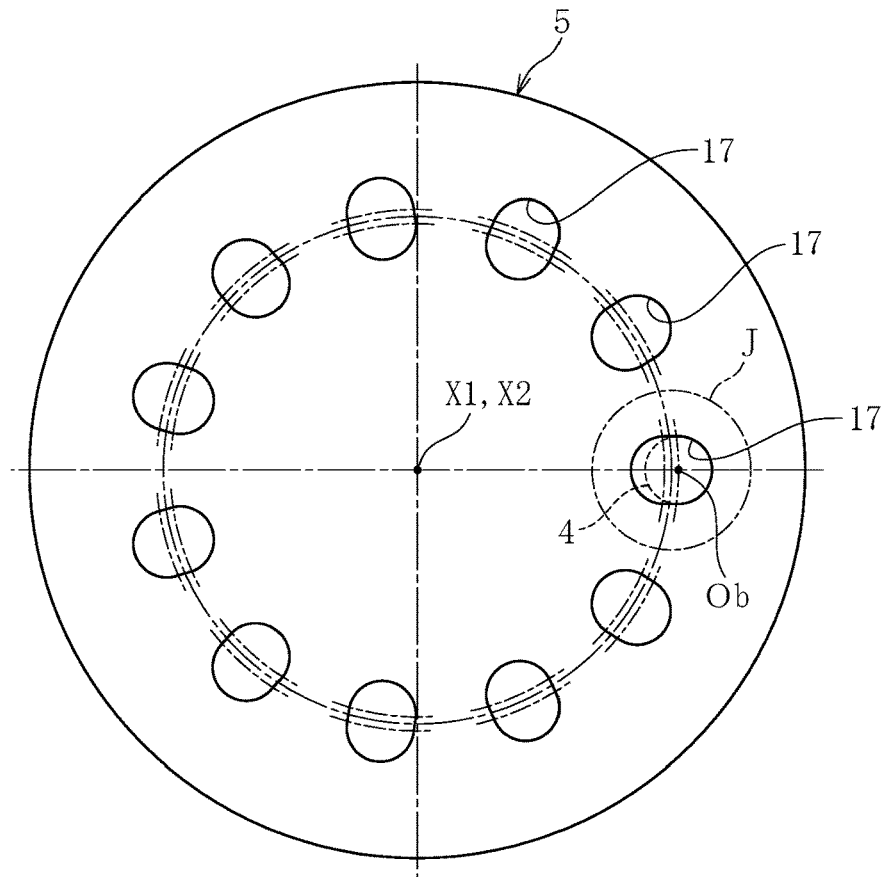
FIG. 6A is a side view for illustrating the retainer as seen in a direction indicated by the arrows of the line I-I of FIG. 1.
Figure 6B:
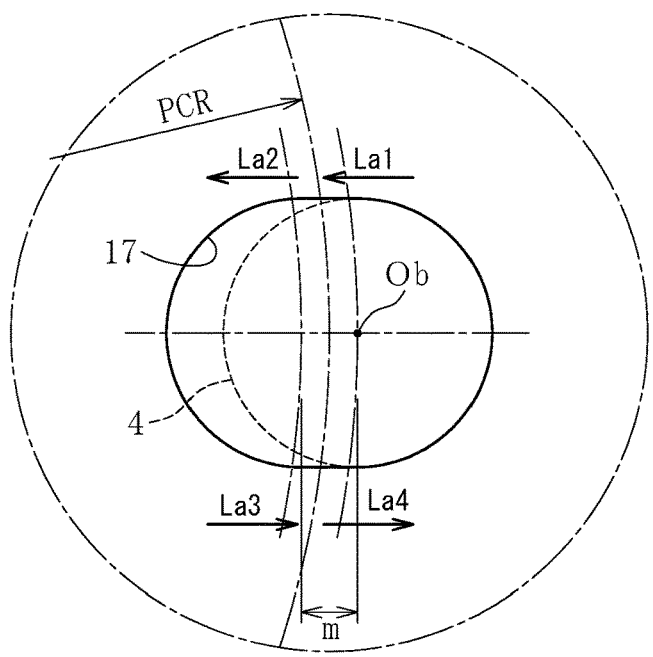
FIG. 6B is an enlarged view for illustrating a portion J of FIG. 6A.

As illustrated in FIG. 1, FIG. 6A, and FIG. 6B, each of the pockets 17 of the retainer 5 is formed of an oblong hole shape which radially extends in a radial direction from the axial center X1 of the rotary shaft 7 as a center. FIG. 6A is a side view for illustrating the retainer as seen in a direction indicated by the arrows of the line I-I of FIG. 1. FIG. 6B is an enlarged view for illustrating a portion J of FIG. 6A. In FIG. 6A and FIG. 6B, the through holes 18 and 23 on the outer periphery side of the retainer 5 and the radially inner surface 5a to which the rolling bearing 12 is mounted in FIG. 1 are omitted.

The number of the pockets 17 of the retainer 5 is eleven, which is more than the number (ten) of the crests or the troughs of the wave-shaped curve L2 of the raceway center line L2 by one. The pockets 17 are formed at equal intervals in a circumferential direction. One ball 4 is arranged in each of the pockets 17. Each of the pockets 17 is formed of an oblong hole shape which radially extends in the radial direction, and hence the ball 4 in each of the pockets 17 can thus move within a range of a predetermined amount "m" radially outward and radially inward with respect to the reference pitch circle radius PCR. The retainer 5 is provided so as to be prevented from being rotatable and the ball 4 is held in the pocket 17 of the retainer 5 so as to be movable in the radial direction.

In the speed reducer 1 according to the first embodiment, the number of the crests of the raceway center line L2 of the second ball engagement groove 16 is ten (similarly, the number of the troughs is ten), and the number of the balls 4 is eleven. Therefore the speed reduction ratio "i" is determined by the following expression, and is thus −1/10.

Speed reduction ratio i=(number of crests−number of balls)/number of crests

That is, the output plate has a wave-shaped groove of "N" peaks/rotation ("N" is the number of crests per rotation). The output plate is driven to rotate through movement of the balls along this wave-shaped groove. Therefore, the speed reduction ratio is expressed by i=(N−n)/N. On this occasion, "n" is the number of the balls, and "N" is the number of peaks of the wave-shaped groove. The number "n" of the balls is set to N±1, and, thus, i=−(±)/N is given. When "i" is positive, the input plate and the output plate rotate in the same direction. When "i" is negative, the input plate and the output plate rotate in opposite directions.

Figure 2:
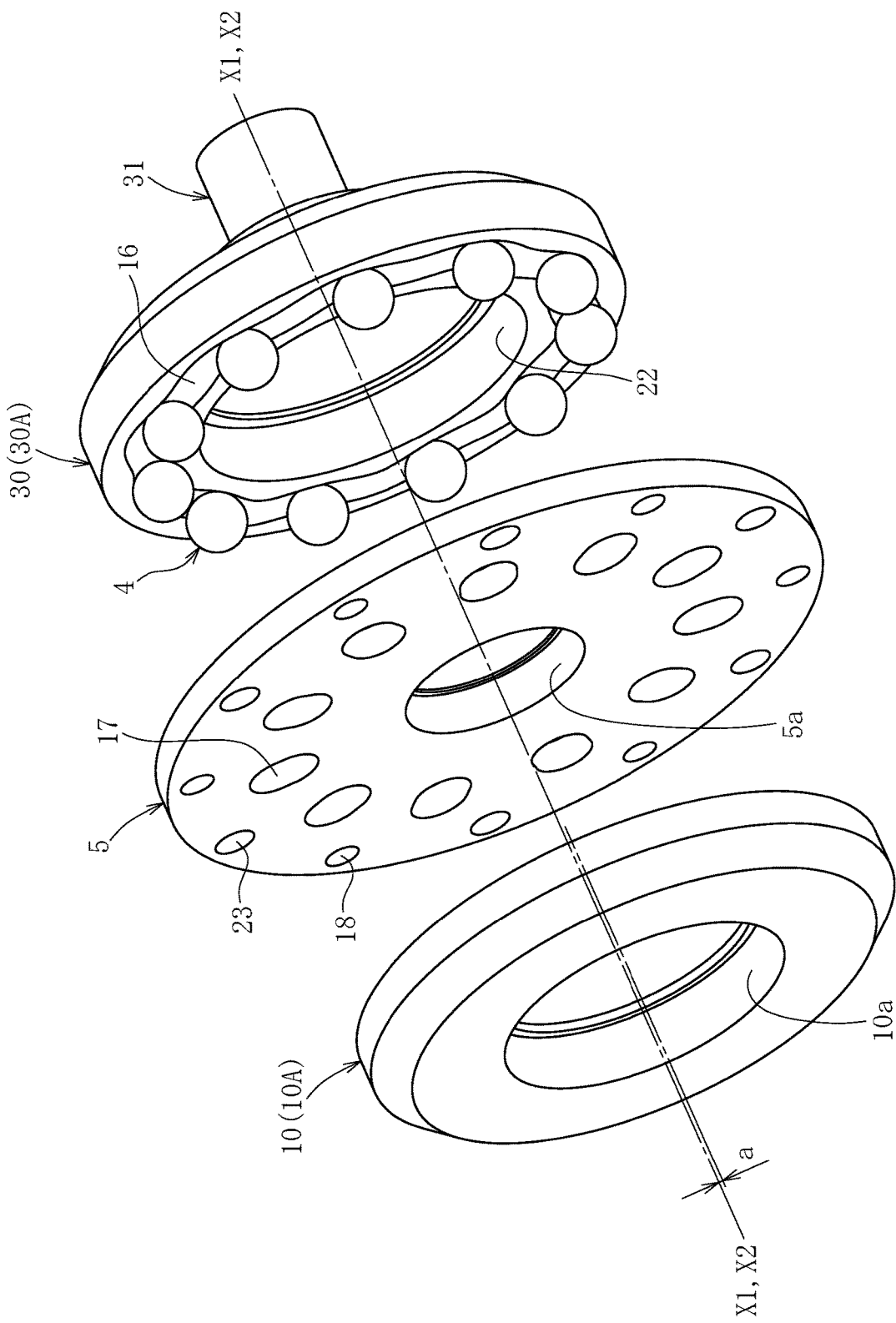
FIG. 2 is an exploded perspective view for illustrating a main part of FIG. 1.

Next, with reference to FIG. 2 and FIG. 3, description is made of a combination state of the input plate 10A, the retainer 5, the balls 4, and the output plate 30A. FIG. 2 is a perspective view for illustrating a main part of FIG. 1. FIG. 3 is a schematic view for illustrating a state in which the balls of FIG. 2 are arranged in the pockets of the retainer. In FIG. 3, the chamfer of the radially outer surface and the radially inner surface 10a for bearing-mounting of the input plate 10A, through holes 18 and 23 on the radially outer side and the radially inner surface 5a for bearing-mounting of the retainer 5, the radially inner surface 22 for bearing-mounting and the shaft 31 of the output plate 30A, and the like of FIG. 2 are omitted.

The axial center X1 of the rotary shaft 7 of the input-side rotary member 2 and the axial center X2 of the output-side rotary member 3 are coaxially arranged. An axial center of the retainer 5 is also coaxially arranged with the axial centers X1 and X2. The curvature center O1 (see FIG. 4A) of the raceway center line L1 of the first ball engagement groove 13 of the input plate 10A is eccentric by the eccentric amount "a" with respect to the axial center X1 of the rotary shaft 7. In other words, a radial center of the raceway center line L1 of the first ball engagement groove 13 of the input plate 10A is eccentric by the eccentric amount "a" with respect to the axial center X1 of the rotary shaft 7.

FIG. 2 is a view for illustrating a state in which the balls 4 engage with the second ball engagement groove 16 of the output plate 30A. The balls 4 are arranged in the pockets 17 of the retainer 5, and are in such a state that the balls 4 protrude toward a near side from the pockets 17 in FIG. 2. Consequently, the balls 4 engage with the first ball engagement groove 13 (see FIG. 1) of the input plate 10A. That is, as illustrated in FIG. 3, near sides of the balls 4 in the pockets 17 of the retainer 5 in FIG. 2 engage with the first engagement groove 13 (see FIG. 1) of the input plate 10A, and far sides of the balls 4 in FIG. 2 engage with the second ball engagement groove 16 of the output plate 30A.

Figure 7:
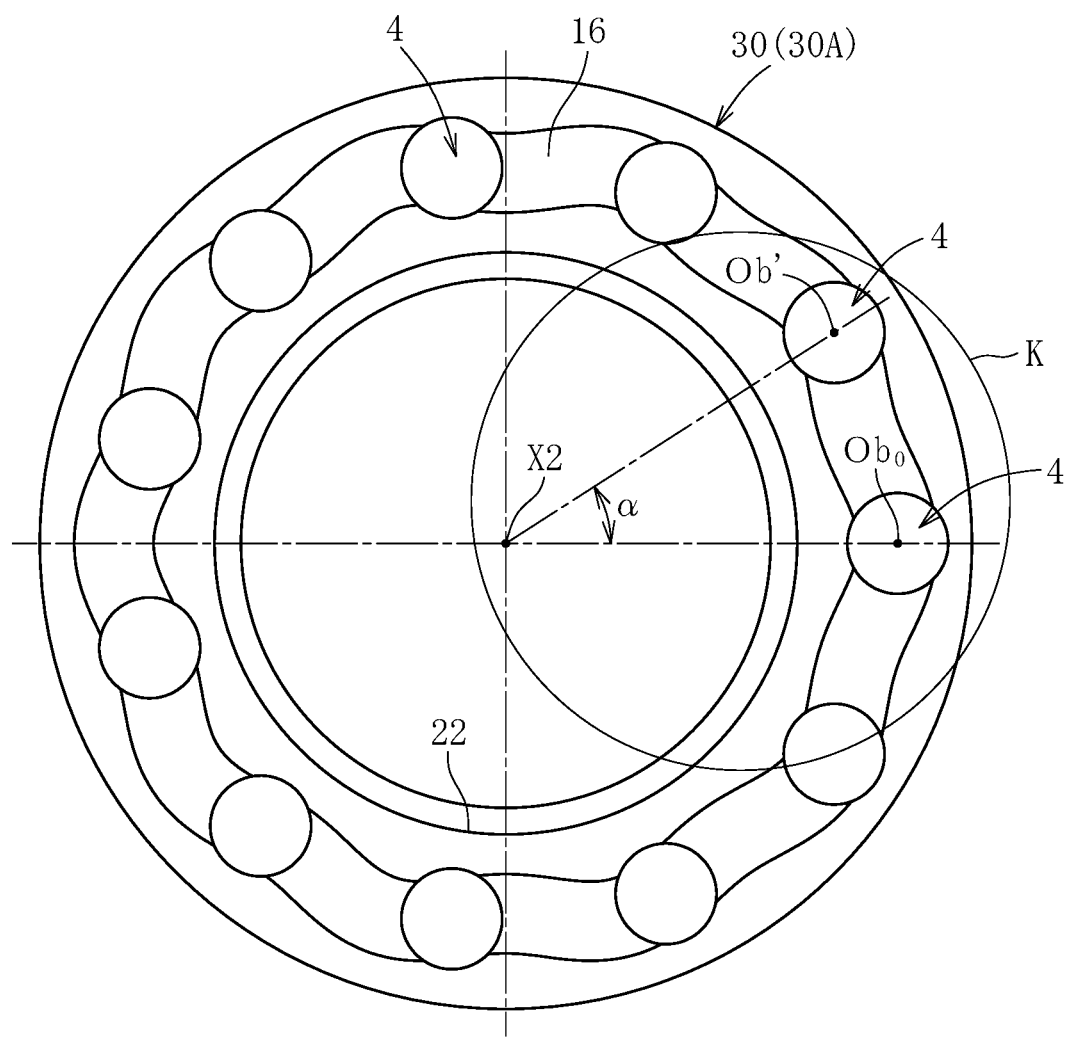
FIG. 7 is a view for illustrating an arrangement state of a ball engagement groove of the output plate and balls.
Figure 8:
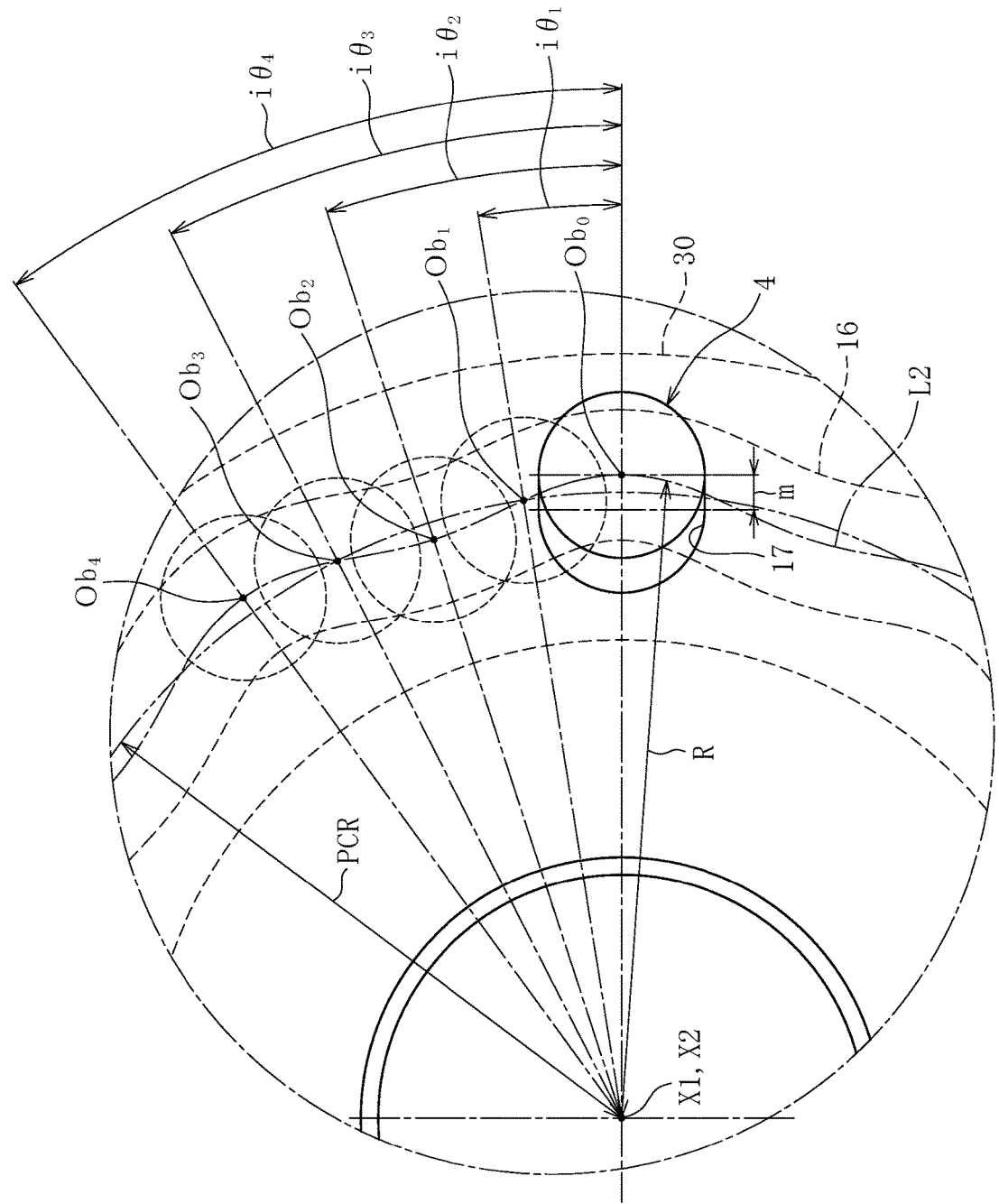
FIG. 8 is a view for illustrating a movement of the ball with respect to the ball engagement groove.
Figure 9:
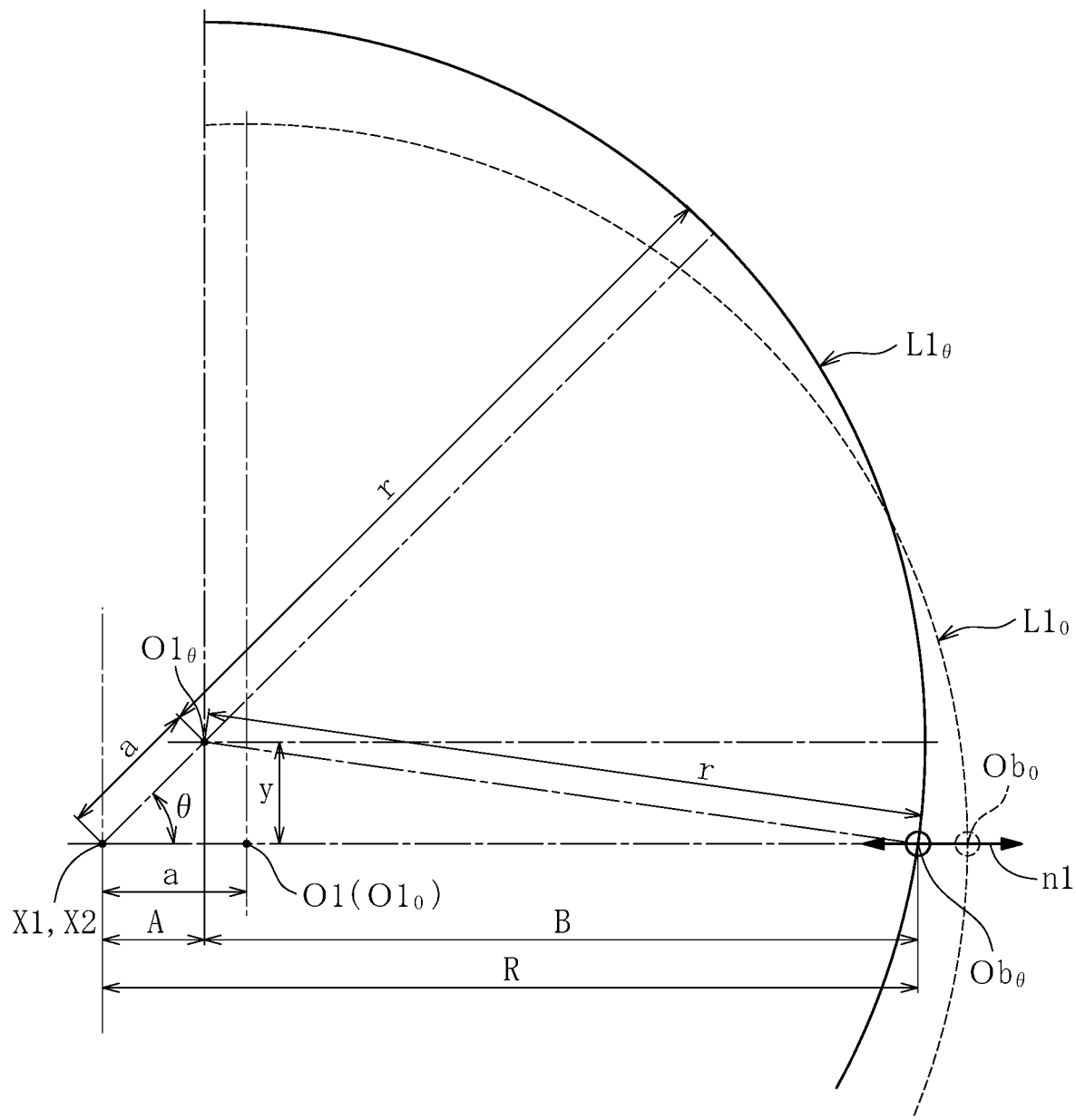
FIG. 9 is a schematic view for illustrating derivation of a reference curve of the ball engagement groove of the output plate.

The overall configuration of the speed reducer 1 according to the first embodiment is as described above. Next, with reference to FIG. 7 to FIG. 9, detailed description is made of the ball engagement grooves configured so that the output-side rotary member synchronously rotates at the reduced speed with respect to the input-side rotary member. FIG. 7 is a view for illustrating an arrangement state of the second ball engagement groove of the output plate and the balls. FIG. 8 is an enlarged view of a portion K of FIG. 7, and is an illustration of a movement of the ball with respect to the second ball engagement groove. FIG. 9 is a schematic view for illustrating derivation of a reference curve of the second ball engagement groove on the output plate.

As described above, the retainer 5 is provided so as to be prevented from being rotatable. The ball 4 is held so as to be movable in the radial direction by the pocket 17 of the retainer 5. As illustrated in FIG. 7, the balls 4 engage with the second ball engagement groove 16 of the output plate 30A at positions at an equal angle in the circumferential direction. In this embodiment, the number of the balls 4 is eleven. Therefore, when an angle between straight lines connecting the axial center X2 and centers $Ob_0$ and Ob' of the balls 4 adjacent to each other in the circumferential direction is indicated by α, α=360°/11 is satisfied, and all the angles α between the balls 4 adjacent to each other are equal.

With reference to FIG. 8, description is made of the state in which the output-side rotary member 3 rotates synchronously at the reduced speed with respect to the input-side rotary member 2. As described above, the retainer 5 is configured unrotatable with respect to the rotations of the input-side rotary member 2 and the output-side rotary member 3. Thus, the pocket 17 indicated as a solid line of FIG. 8 does not move in the circumferential direction. A center line in a horizontal direction of FIG. 8 indicates a position at which the rotation angle θ of the rotary shaft 7 of the input-side rotary member 2 is 0°. The ball 4 is positioned on the outermost side in the radial direction in the pocket 17. This is because the centrifugal whirling radius a with respect to the axial center X1 of the rotary shaft 7 of the input plate 10A is on the center line in the horizontal direction of FIG. 8 in the revolution motion of the input plate 10A, and the ball 4 which engages with the first ball engagement groove 13 of the input plate 10A is thus positioned on the outermost side in the radial direction in the pocket 17.

When the rotary shaft 7 rotates by a rotation angle $θ_1$, the position of the centrifugal whirling radius "a" of the input plate 10A moves to a position at the rotation angle θ1, the ball 4 engaging with the first ball engagement groove 13 of the input plate 10A moves toward the radially inner side in the radial direction in the pocket 17, and the center of the ball 4 moves to a position $Ob_1$. In the state in which the center of the ball 4 is at $Ob_1$, the ball 4 engages with the second ball engagement groove 16 of the output plate 30A, in other words, the center $Ob_1$ of the ball 4 is positioned on the raceway center line L2 of the second ball engagement groove 16, and the output plate 30A thus rotates by a rotation angle $iθ_1$ illustrated in FIG. 8. Then, when the rotary shaft 7 rotates by a rotation angle $θ_2$, and further by rotation angles $θ_3$ and $θ_4$, in a manner similarly to the description made above, the output plate 30A rotates by rotation angles $iθ_2$, $iθ_3$, and $iθ_4$. As a result, the rotary motion reduced in speed (speed reduction ratio i=−1/10) is transmitted from the input-side rotation plate 2 to the output-side rotation plate 3.

The speed reducer 1 according to the first embodiment is characterized in that the rotary motion reduced in speed is transmitted as the synchronous rotation from the input-side rotary member 2 to the output-side rotary member 3. As a result, a high rotation precision and vibration suppression can be achieved. The shape of the wave-shaped curve of the raceway center line L2 of the second ball engagement groove 16 of the output plate 30A is set so that the rotary motion reduced in speed is transmitted as the synchronous rotation from the input-side rotary member 2 to the output-side rotary member 3.

With reference to FIG. 9, description is made of a derivation method for the wave-shaped curve of the raceway center line L2 of the second ball engagement groove 16 of the output plate 30A. FIG. 9 is a schematic view for illustrating the derivation of the wave-shaped curve of the raceway center line L2 of the second ball engagement groove 16. A center line in the horizontal direction of FIG. 9 corresponds to the center line in the horizontal direction of FIG. 8, and indicates the position at which the rotation angle θ of the rotary shaft 7 of the input-side rotary member 2 is 0°. A raceway center line $L1_0$ of the first ball engagement groove 13 of the input plate 10A when the rotation angle θ of the rotary shaft 7 is 0° is indicated by a broken line. A raceway center line $L1_e$ of the first ball engagement groove 13 at a given angle θ is indicated as a solid line.

The raceway center line L1 of the first ball engagement groove 13 of the input plate 10A has the circular shape having the radius "r", and the curvature center O1 is eccentric by the eccentric amount "a" with respect to the axial center X1 of the rotary shaft 7 of the input-side rotary member 2. Therefore, when the rotation angle θ is 0°, the curvature center of the raceway center line L1 is at $O1_0$, and the center of the ball 4 is at $Ob_0$, and is positioned on the outermost side in the radial direction. The ball 4 is constrained on a line n1 by the pocket 17 of the retainer 5, and is movable in the radial direction. Then, when the rotary shaft 7 reaches the given angle θ, the curvature center of the raceway center line L1 moves to $O1_e$, and the center of the ball 4 moves to $Ob_e$. The ball 4 at this position engages with the second ball engagement groove 16 of the output plate 30A. That is, such a relationship that the center $Ob_e$ of the ball 4 is positioned on the raceway center line L2 (see FIG. 8) of the second ball engagement groove 16 is established. As a result of this positional relationship, the rotation angle of the output plate 30A is always iθ with respect to a given rotation angle θ of the rotary shaft 7, which establishes the synchronous rotation between the rotary shaft 7 and the output plate 30A. Based on this fact, the distance R between the axial center X1 of the rotary shaft 7 and the raceway center line L2 of the second ball engagement groove is geometrically determined.

As illustrated in FIG. 9, the distance R between the axial center X1 of the rotary shaft 7 and the raceway center line L2 of the second ball engagement groove is expressed by the following Expression 3:

$$R = a \cdot \cos(\psi/i) + \sqrt{r^2 - (a \cdot \sin(\psi/i))^2} \quad \text{[Expression 3]}$$

where R represents a distance between axial center of rotary shaft and raceway center line of second ball engagement groove; a represents an eccentric amount; i represents a speed reduction ratio; ψ represents a rotation angle of output plate; and r represents a radius of raceway center line of first ball engagement groove.

That is, as appreciated from FIG. 9, Expression 4, Expression 5, Expression 6, Expression 7, and Expression 8 are established.

$$R = A + B \quad \text{[Expression 4]}$$

$$A = a \cdot \cos θ \quad \text{[Expression 5]}$$

$$B^2 = r^2 - y^2 = r^2 - (a \cdot \sin θ)^2 \quad \text{[Expression 6]}$$

$$B = \sqrt{r^2 - (a \cdot \sin θ)^2} \quad \text{[Expression 7]}$$

$$R = a \cdot \cos θ + \sqrt{r^2 - (a \cdot \sin θ)^2} \quad \text{[Expression 8]}$$

On this occasion, for the synchronous rotation of the speed reducer, the speed reduction ratio i=iψ/θ needs to be established. Therefore, the numerical expression of Expression 3 can be obtained from Expression 8.

A summarized description is now made of an operation of the speed reducer 1 according to the first embodiment. When the rotary shaft 7 of the input-side rotary member 2 is rotated, the input plate 10A revolves about the axial center X1 of the rotary shaft 7. On this occasion, the input plate 10A is rotatable with respect to the eccentric cam 8 provided on the rotary shaft 7. Therefore, the input plate 10A hardly performs a rotation motion. As a result, a relative friction amount between the pockets of the retainer and the ball engagement grooves, and the balls can be reduced, thereby being capable of increasing a transmission efficiency from the input-side rotary member to the output-side rotary member.

When the input plate 10A performs the revolution motion, the balls 4 which engage with the first ball engagement grooves 13 formed of the circular raceway center line L1 are constrained in the pockets 17 of the retainer 5 provided unrotatably, and respectively move in the radial direction.

The respective balls 4 engage with the second ball engagement groove 16 of the output plate 30A of the output-side rotary member 3. Thus, as illustrated in FIG. 8, the rotation of the rotary shaft 7 of the input-side rotary member 2 is reduced in speed, thereby rotating the output-side rotary member 3 in accordance with the movement operations of the respective balls 4 in the radial direction. On this occasion, the reference curve of the raceway center line L2 of the second ball engagement groove 16 of the output plate 30A is set as described with reference to FIG. 9, and the output-side rotary member 3 thus synchronously rotates at the reduced rotation speed with respect to the rotary shaft 7.

The speed reducer 1 according to the first embodiment operates as described above. A speed reducer which is capable of achieving a small size and a high speed reduction ratio, and capable of suppressing fluctuation in rotation speed and vibration on the output side is obtained. Moreover, the shapes of the first ball engagement groove formed of the circular raceway center line and the second ball engagement groove formed of the raceway centerline having the wave-shaped curve can be simplified as a whole, thereby being capable of simplifying manufacture and reducing the cost of the manufacture.

Figure 10A:
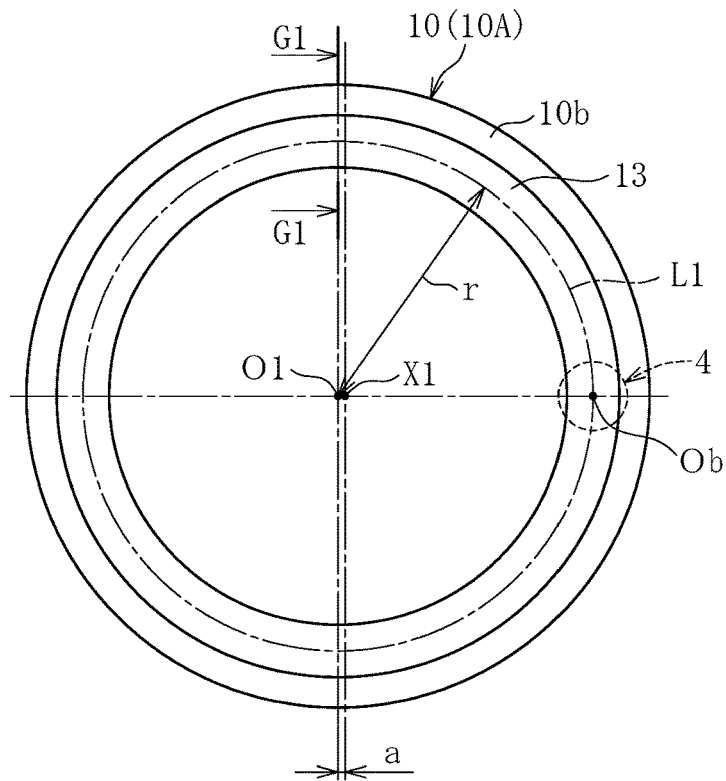
FIG. 10A is a side view for illustrating the input plate having a ball engagement groove in a Gothic arch shape.
Figure 10B:
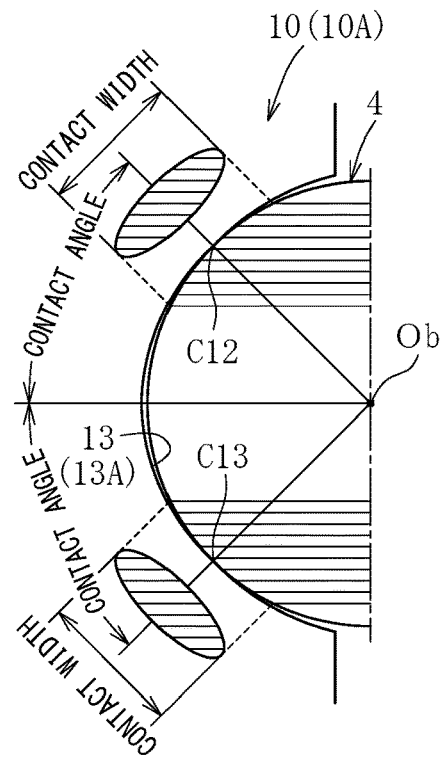
FIG. 10B is a sectional view for illustrating the input plate taken along the line G1-G1 of FIG. 10A.

As illustrated in FIG. 10A and FIG. 10B, the first ball engagement groove 13 may be a ball engagement groove 13A having a sectional shape in a so-called Gothic arch shape. In this case, as illustrated in FIG. 10B, the ball 4 is in an angular contact with the ball engagement groove 13A of the input plate 10A at two points C12 and C13. In this case, contact angles formed by the contact points C12 and C13 can be set to, for example, approximately 30° to 40°. Hatchings of FIG. 10B indicate contact portions.

Figure 11A:
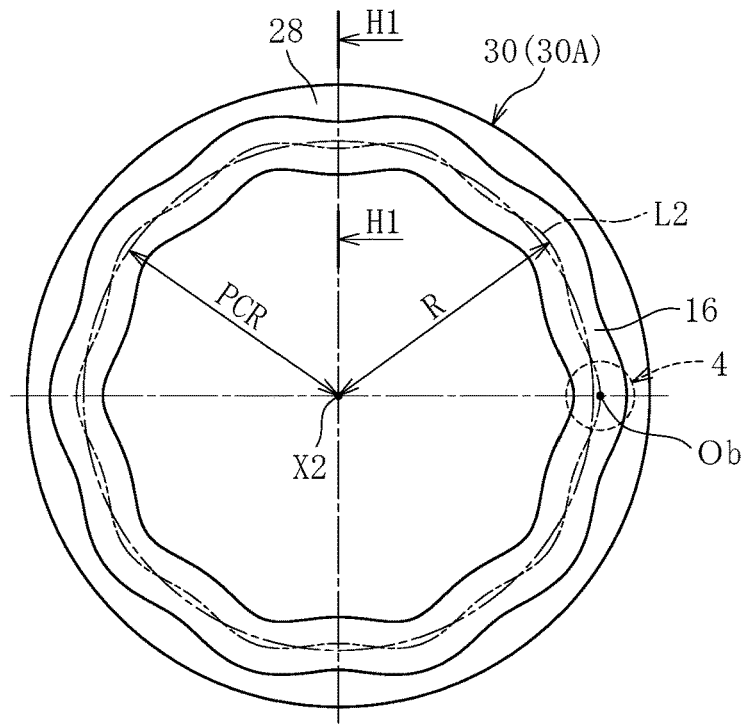
FIG. 11A is a side view for illustrating the output plate having the ball engagement groove in the Gothic arch shape.
Figure 11B:
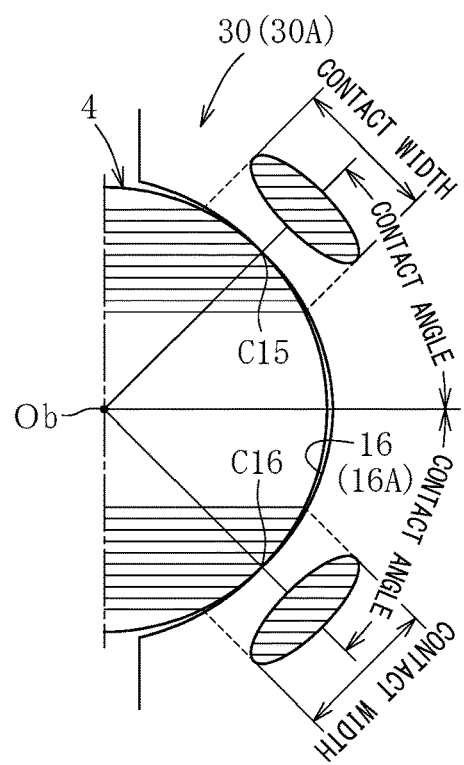
FIG. 11B is a sectional view for illustrating the output plate taken along the line H1-H1 of FIG. 11A.

As illustrated in FIG. 11A and FIG. 11B, the second ball engagement groove 16 may be a ball engagement groove 16A having a sectional shape in a so-called Gothic arch shape. In this case, as illustrated in FIG. 11B, the ball 4 is in an angular contact with the ball engagement groove 16A of the output plate 30A at two points C15 and C16. In this case, contact angles formed by the contact points C12 and C13 can be set to, for example, approximately 30° to 40°. Hatchings of FIG. 11B indicate contact portions.

When the ball engagement groove 13 is the ball engagement groove 13A having the Gothic arch shape as illustrated in FIGS. 10A and 10B, or the ball engagement groove 16 is the ball engagement groove 16A having the Gothic arch shape illustrated in FIG. 11A and FIG. 11B, the ball can stably be arranged in position, and a synchronous rotation characteristic (constant velocity characteristic) can be improved. Therefore, a speed changer having excellent durability and high quality can be provided.

FIG. 12 to FIG. 16 are views for illustrating a speed reducer according to a second embodiment. An input plate 10 (10B) of the speed reducer is different from the input plate 10A of the speed reducer according to the first embodiment, and, as illustrated in FIG. 15A, comprises a first ball engagement groove 13B in a polygonal cylindrical shape. Moreover, the output plate 30 (30B) in this case has a second ball engagement groove 16B formed of a wave-shaped groove as the output plate 30A of the speed reducer according to the first embodiment.

Also in this case, the input plate 10B is externally fitted to the eccentric cam 8, and the center of the ball engagement groove 13B is eccentric by the predetermined amount "a" with respect to the axial center of the rotary shaft. Other configurations of the speed reducer according to the present invention illustrated in FIG. 12 to FIG. 16 are the same as those of the first embodiment. Therefore, the other configurations are denoted by the same reference symbols as those of the speed reducer according to the first embodiment illustrated in FIG. 1 and the like, and description thereof is thus omitted.

Figure 17:
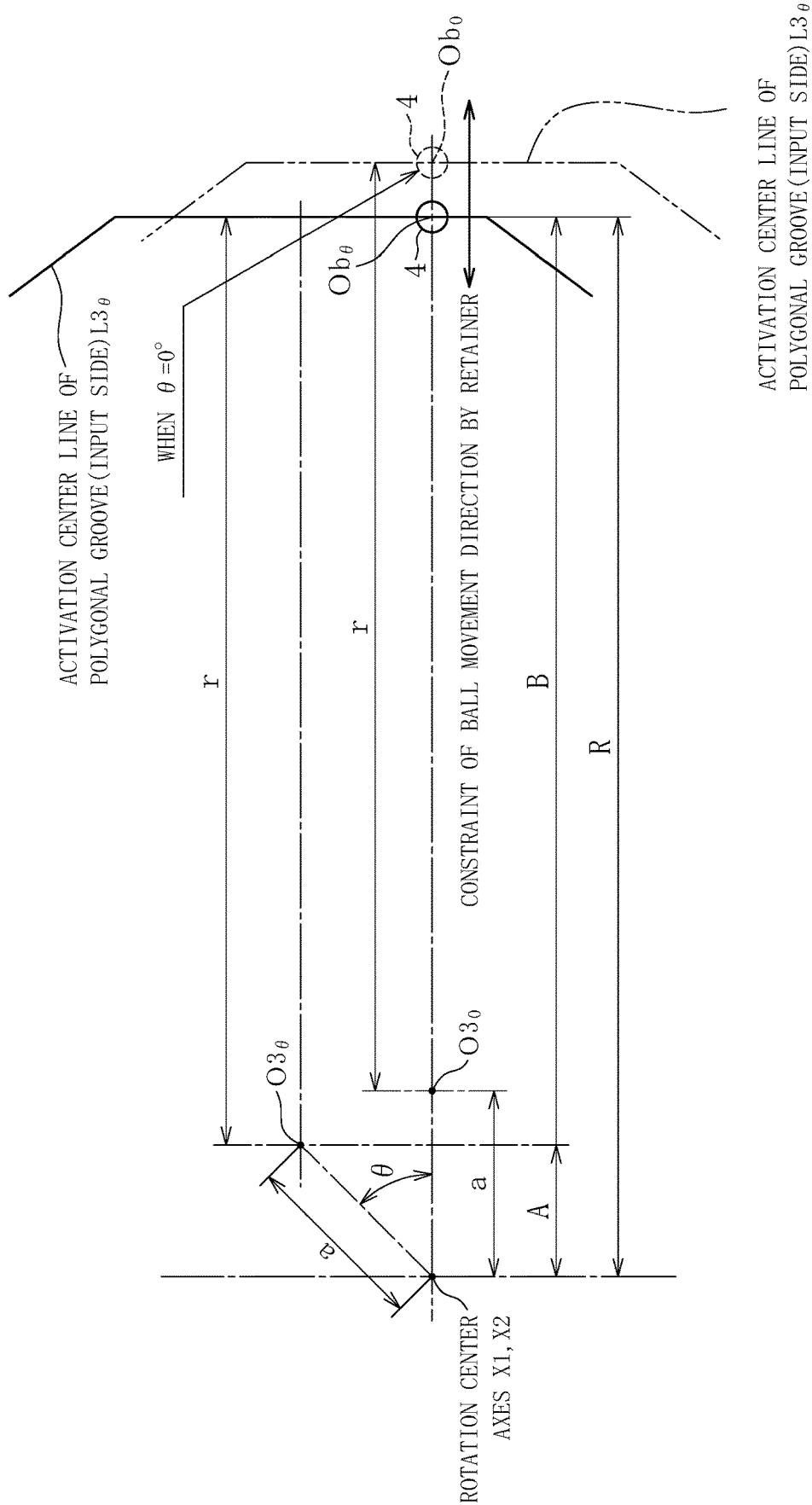
FIG. 17 is a schematic view for illustrating derivation of a reference curve of the ball engagement groove of the output plate of the speed reducer illustrated in FIG. 12.

FIG. 17 is a schematic view for illustrating the derivation of the wave-shaped curve of the raceway center line (reference curve) of the second ball engagement groove 16B. A center line in the horizontal direction of FIG. 17 corresponds to the center line in the horizontal direction of FIG. 8, and indicates the position at which the rotation angle θ of the rotary shaft 7 of the input-side rotary member 2 is 0°. A raceway center line $L3_0$ of the first ball engagement groove 13B of the input plate 10B when the rotation angle θ of the rotary shaft 7 is 0° is indicated by a broken line. A raceway center line $L3_0$ of the first ball engagement groove 13B at a given angle θ is indicated as a solid line.

The raceway center line L3 of the first ball engagement groove 13B of the input plate 10A has a polygonal shape with respect to the axial center X1 of the rotary shaft 7 of the input-side rotary member 2, and the center O3 is eccentric by the eccentric amount "a". Therefore, when the rotation angle θ is 0°, the curvature center of the raceway center line L3 is at $O3_0$, and the center of the ball 4 is at $Ob_0$, which is positioned on the outermost side in the radial direction. The ball 4 is movable in the radial direction in the pocket 17 of the retainer 5. Then, when the rotary shaft 7 reaches the given angle θ, the curvature center of the raceway center line L3 moves to $O3_0$, and the center of the ball 4 moves on L3 indicated as a solid line. The ball 4 at this position engages with the second ball engagement groove 16 of the output plate 30. That is, such a relationship that the center $Ob_e$ of the ball 4 is positioned on the raceway center line L2 (see FIG. 8) of the second ball engagement groove 16 is established. As a result of this positional relationship, the rotation angle of the output plate 30 is always iθ with respect to a given rotation angle θ of the rotary shaft 7, which establishes the synchronous rotation between the rotary shaft 7 and the output plate 30. Based on this fact, the distance R between the axial center X1 of the rotary shaft 7 and the raceway center line L2 of the second ball engagement groove is geometrically obtained.

Figure 12:
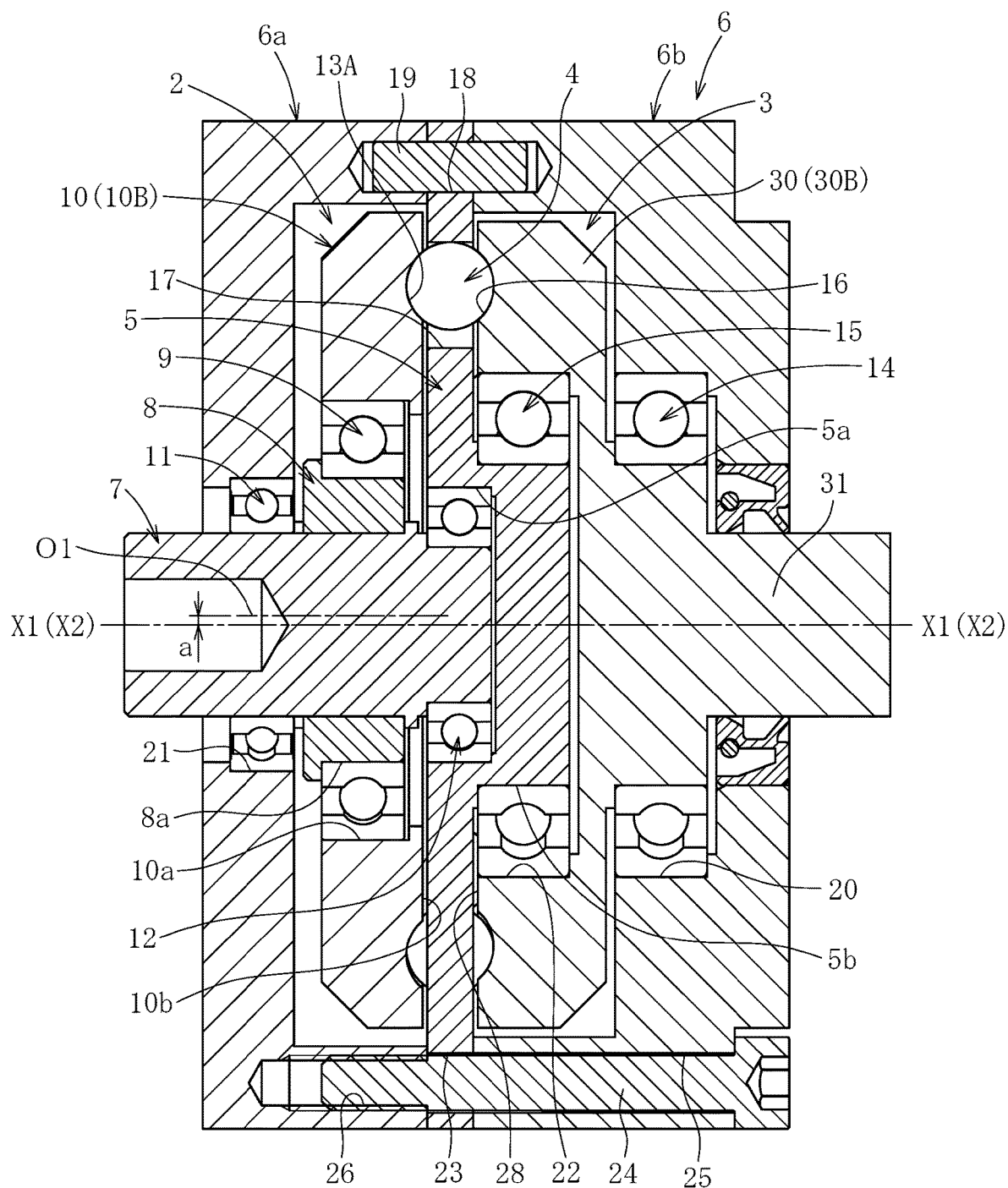
FIG. 12 is a sectional view for illustrating a speed reducer according to a second embodiment of the present invention.
Figure 13:
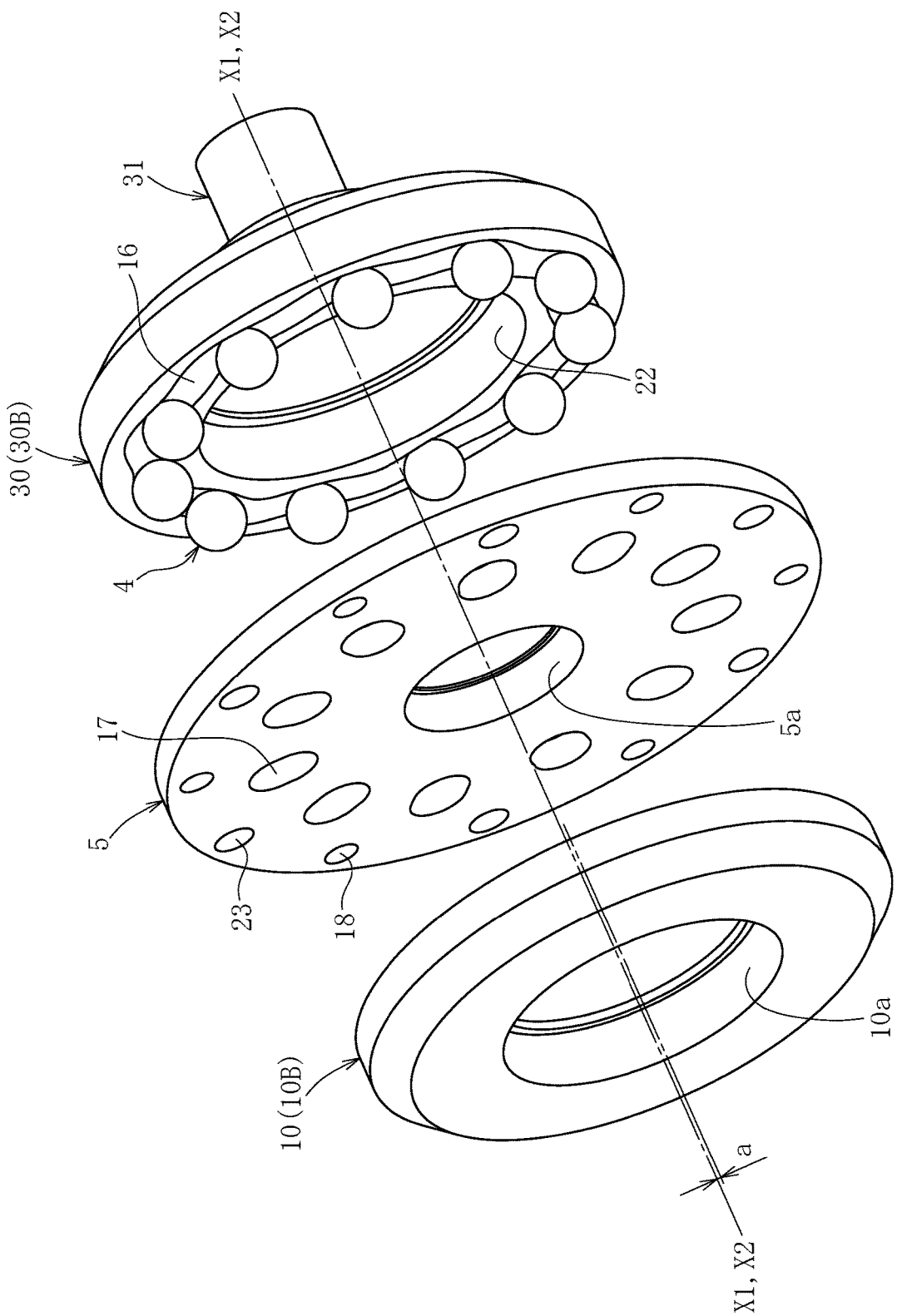
FIG. 13 is a perspective view for illustrating a main part of the speed reducer illustrated in FIG. 12.
Figure 15A:
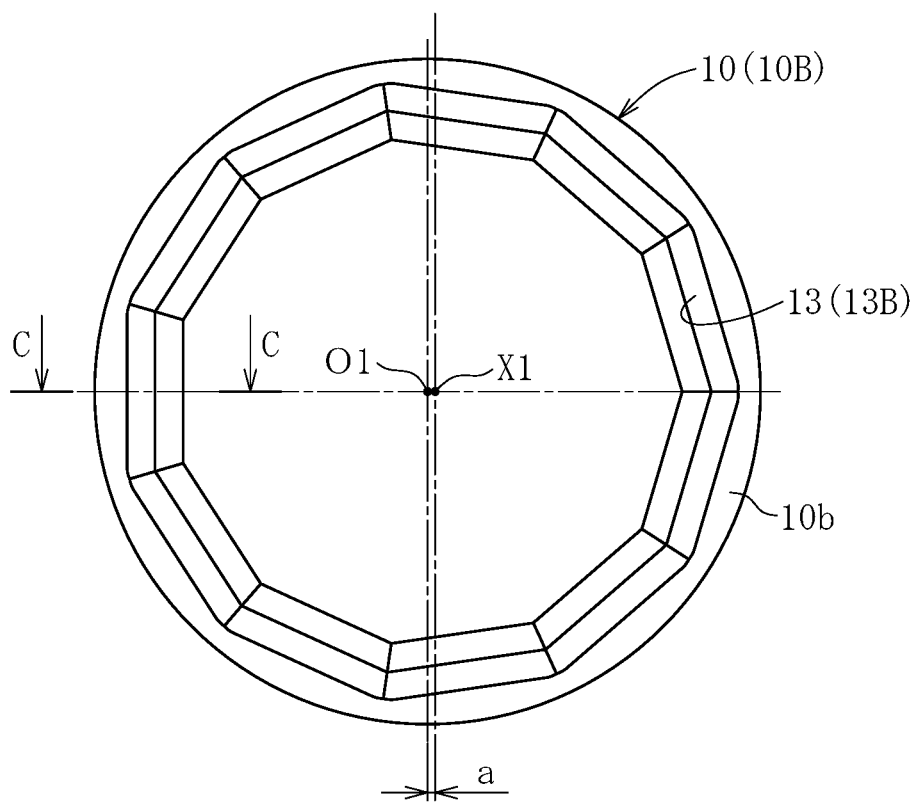
FIG. 15A is a side view for illustrating the input plate of the speed reducer illustrated in FIG. 12.
Figure 15B:
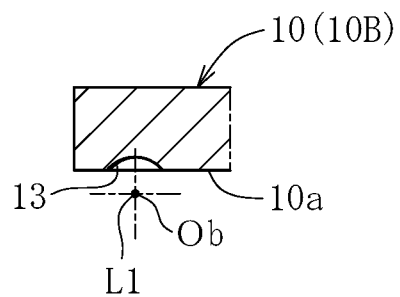
FIG. 15B is a sectional view taken along the line C-C of FIG. 15A.
Figure 16A:
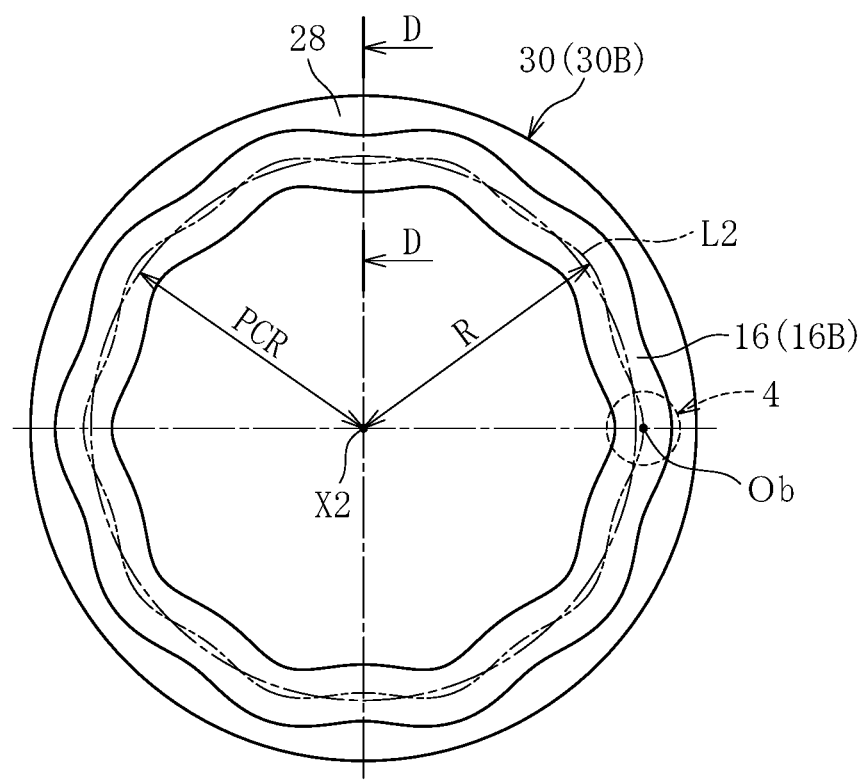
FIG. 16A is a side view for illustrating the output plate of the speed reducer illustrated in FIG. 12.
Figure 16B:
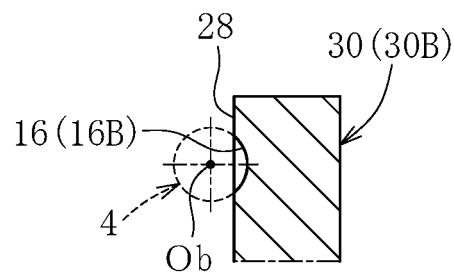
FIG. 16B is a sectional view taken along the line D-D of FIG. 16A.

As illustrated in FIG. 17, in the speed reducer according to the present invention illustrated in FIG. 12 and the like, the distance R between the axial center X1 of the rotation center shaft and the center of the ball 4 is expressed by the following Expression 9:

$$R = a \cdot \cos(\psi/i) + r \quad \text{[Expression 9]}$$

where R represents a distance between rotation center shaft (speed-reducer rotation axis) and balls; a represents an offset amount (eccentric amount) of center axis of input plate; r represents a pitch circle radius; ψ represents a rotation angle of output plate; and i represents a speed reduction ratio.

That is, as appreciated from FIG. 17, Expression 10, Expression 11, and Expression 12 are established.

$$R = A + B \quad \text{[Expression 10]}$$

$$A = a \cdot \cos\theta, B = r \quad \text{[Expression 11]}$$

$$R = a \cdot \cos\theta + r \quad \text{[Expression 12]}$$

On this occasion, for the synchronous rotation of the speed reducer, the speed reduction ratio i=ψ/θ needs to be established. Therefore, the numerical expression of Expression 9 can be obtained from Expression 12.

Incidentally, when the groove 13 of the input plate 10 is a circular groove as in the first embodiment, when the input plate 10 rotates by one turn, the balls 4 reciprocate once in the oblong holes 17 (pockets) in the retainer 5, and the output plate 30 rotates "i" times. Features of the first embodiment and the second embodiment can be recognized by dividing a rotation angle dθ (0°≤θ≤360°) of the input plate 10 into the four quadrants (0° to 90°, 90° to 180°, 180° to 270°, and 270° to 360°) and focusing on the movement of the ball in each of the quadrants.

The rotation angle dθ given when the offset amount of the input plate 10 is maximum is set to 0°, and the ball 4 to be observed is the farthest ball from the rotary shaft when dθ=0° is given. Out of a distance given when the ball 4 reciprocates once in the oblong hole 17 formed in the retainer 5, a movement distance of the ball 4 given when the rotation angle dθ of the input plate 10 is in the first quadrant is indicated by La1 (see FIG. 6B); in the second quadrant, La2 (see FIG. 6B); in the third quadrant, La3 (see FIG. 6B); and in the fourth quadrant, La4 (see FIG. 6B). When the movement distances La1 and La2 (or La3 and La4) of the ball 4 are compared with each other, as is apparent from FIG. 18A, in the first embodiment, the movement distances La1 and La2 (or La3 and La4) are apparently different from each other.

Figure 18A:
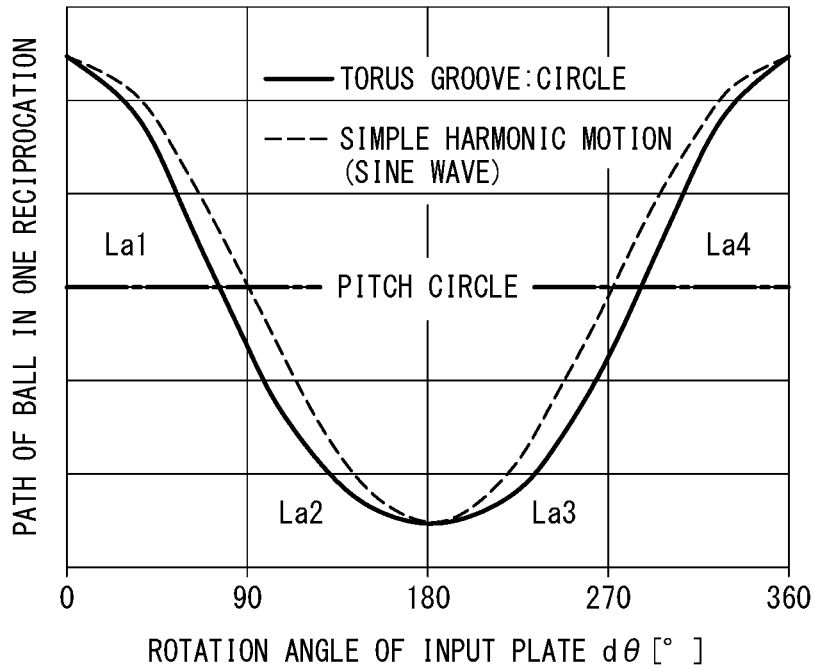
FIG. 18A is a graph for showing a relationship between a rotation angle of the input plate and a path of the ball for one reciprocation when the groove on the input plate has a circular shape.

That is, when the groove 13 of the input plate 10 has a circular shape, as illustrated in FIG. 18A, La1 and La2 (or La3 and La4) are different from each other in length. This indicates that the movement distance on the radially outer side and the movement distance on the radially inner side with respect to the pitch circle as a center are different from each other in the one reciprocation in which the ball 4 rolls in the oblong hole 17 of the retainer 5, and fluctuation in speed of the ball 4 in the oblong hole 17 of the retainer 5 is different between those on the radially outer side and on the radially inner side with respect to the pitch circle as the center in order to satisfy the synchronous rotation characteristic (ψ=iθ) between the rotation angle θ of the input plate 10 and the rotation angle ψ of the output plate 30. This indicates that the fluctuation in speed of the ball rolling in the wave-shaped groove 16 of the output plate 30 is different between those on the radially outer side and on the radially inner side with respect to the pitch circle as the center, which may lead to occurrence of vibration and noise.

Figure 18B:
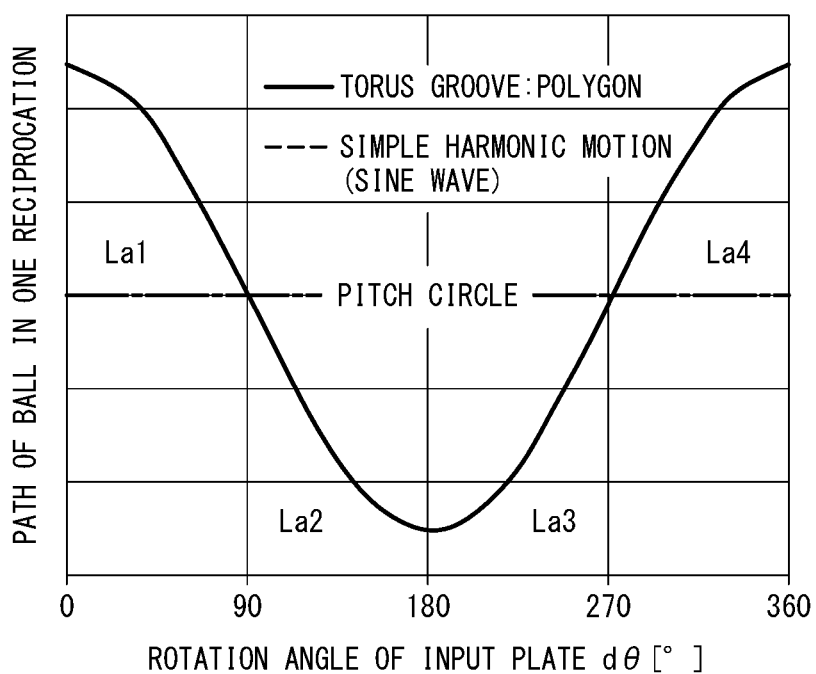
FIG. 18B is a graph for showing a relationship between a rotation angle of the input plate and a path of the ball for one reciprocation when the groove on the input plate has a polygonal cylindrical shape.

In contrast, when the groove 13 of the input plate 10 has a polygonal shape, as illustrated in FIG. 18B, La1 and La2 (or La3 and La4) are equal to each other in length. This indicates that the movement distance on the radially outer side and the movement distance on the radially inner side with respect to the pitch circle as the center are equal (=simple harmonic vibration) in the one cycle in which the ball 4 rolls in the oblong hole 17 of the retainer 5 and the wave-shaped groove 16 of the output plate 30, and indicates that the fluctuation in speed of the ball is equal between those on the radially outer side and on the radially inner side with respect to the pitch circle as the center while the synchronous rotation characteristic (ψ=iθ) between the rotation angle θ of the input plate 10 and the rotation angle ψ of the output plate 30 is maintained.

Therefore, the synchronous rotation characteristic (constant velocity characteristic) between the input plate 10 and the output plate 30 can be improved by forming the groove 13 of the input plate 10 into the polygonal shape (polygonal cylindrical shape). As a result, the fluctuation in rotation speed and the vibration on the output side can be suppressed as much as possible.

According to the second embodiment, as in the first embodiment, the input side and the output side always rotate in synchronization with each other, and a high-quality speed reducer can be provided to have small fluctuation in rotation speed and vibration on the output side can be provided. At the same time, the size can be reduced, and a high speed reduction ratio can be obtained. Moreover, in order to configure the input side and the output side so as to always rotate in synchronization, the groove shapes only need to be determined, which does not lead to an increase in complexity in the groove configuration. In particular, the synchronous rotation characteristic (constant velocity characteristic) between the input side and the output side can be improved by forming the groove shape of the input plate 10 so as to have as many sides as the number of balls 4.

Moreover, when the number of the balls 4 is represented by "n", and the number of peaks of the wave-shaped groove 16 of the output plate 30 is represented by "N", the speed reduction ratio "i" can be set so as to satisfy i=(N−n)/N, and a speed reducer having a small size and a high speed reduction ratio can stably be provided.

The case 6 configured to rotatably accommodate the input plate 10B and the output plate 30B and fix the retainer is provided. The input plate 10B is externally fitted to the eccentric portion of the input shaft 7 through intermediation of the bearing. The output plate 30B is integrated with the output shaft 31 axially supported by the case 6 through intermediation of the bearing so as to be rotatable. Thus, a compact speed reducer can be formed.

Figure 19A:
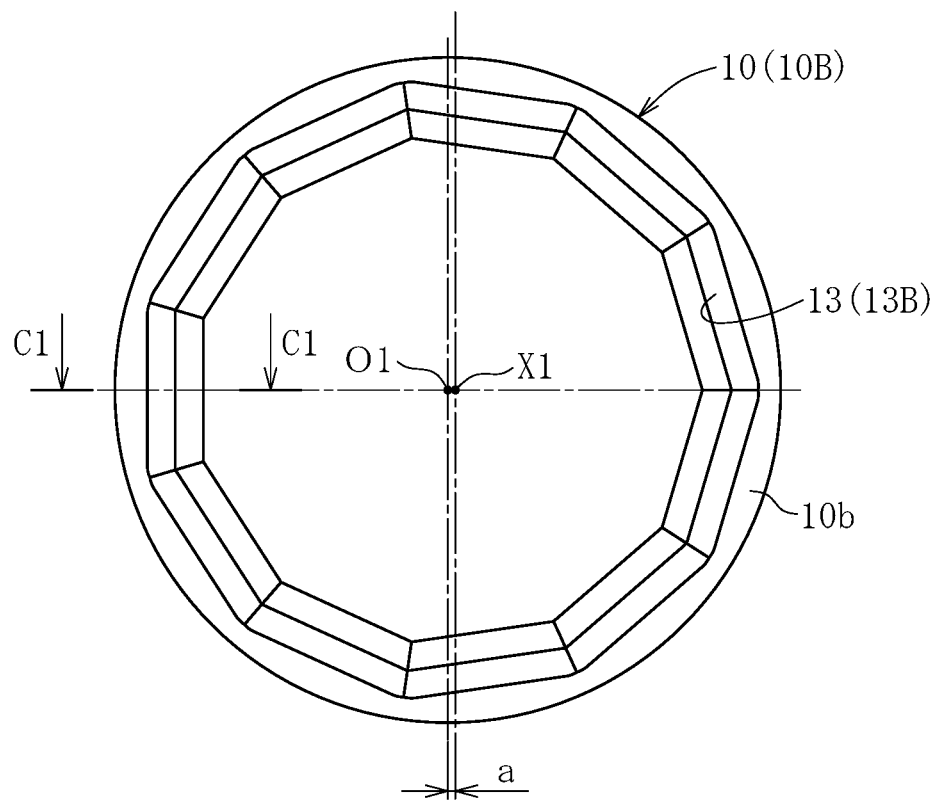
FIG. 19A is a side view for illustrating the input plate having the ball engagement groove in the Gothic arch shape.
Figure 19B:
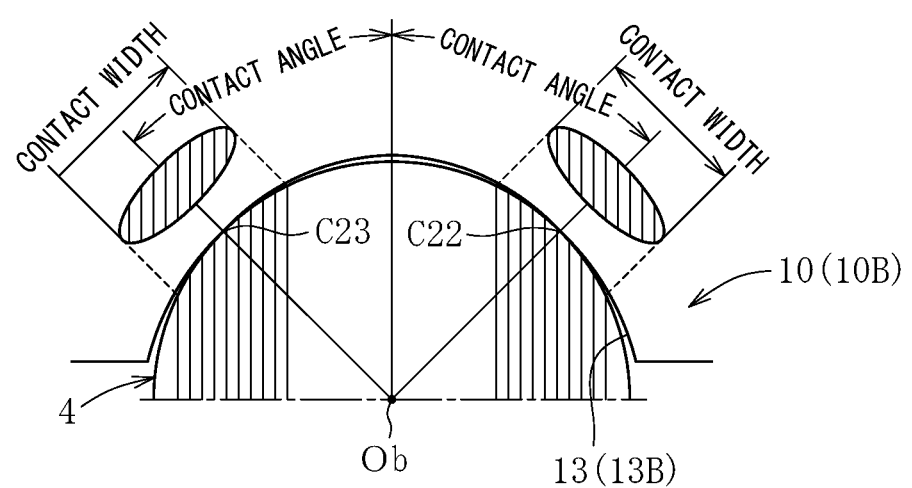
FIG. 19B is a sectional view taken along the line C1-C1 of FIG. 19A.

Also in the speed reducer as illustrated in FIG. 14 to FIG. 18B, the first ball engagement groove 13 may be a ball engagement groove 13B having a sectional shape in a so-called Gothic arch shape, as illustrated in FIG. 19A and FIG. 19B. In this case, as illustrated in FIG. 19B, the ball 4 is in an angular contact with the ball engagement groove 13B of the input plate 10A at two points C22 and C23. In this case, contact angles formed by the contact points C22 and C23 can be set to, for example, approximately 30° to 40°. Hatchings of FIG. 19B indicate contact portions.

Figure 20A:
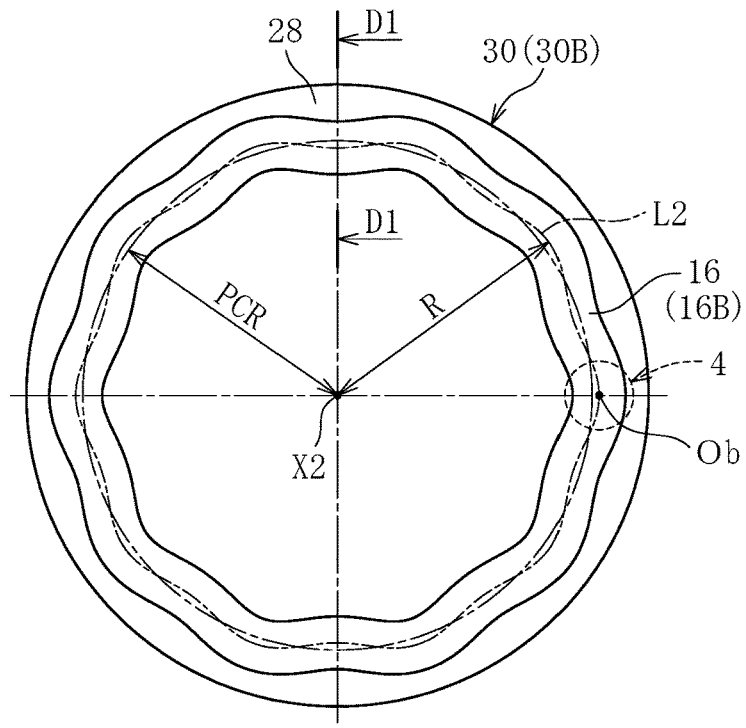
FIG. 20A is a side view for illustrating the output plate having the ball engagement groove in the Gothic arch shape.
Figure 20B:
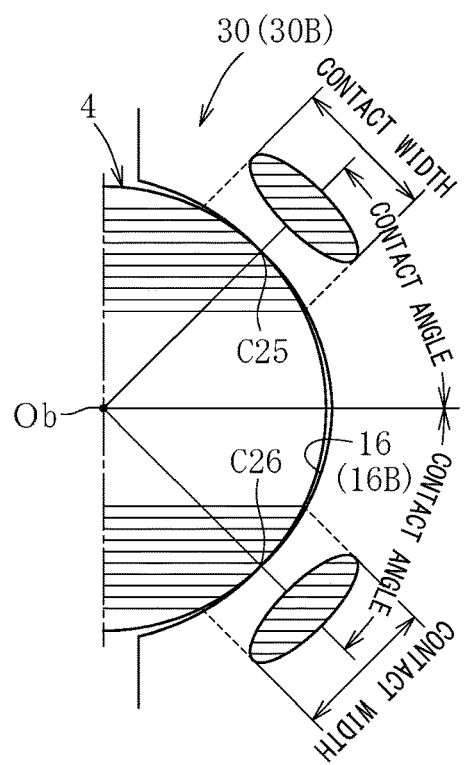
FIG. 20B is a sectional view taken along the line Dl-Dl of FIG. 20A.

As illustrated in FIG. 20A and FIG. 20B, the second ball engagement groove 16 may be a ball engagement groove 16B having a sectional shape in a so-called Gothic arch shape. In this case, as illustrated in FIG. 20B, the ball 4 is in an angular contact with the ball engagement groove 16B of the output plate 30A at two points C25 and C26. In this case, contact angles formed by the contact points C25 and C26 can be set to, for example, approximately 30° to 40°. Hatchings of FIG. 20B indicate contact portions.

When the ball engagement groove 13 is the ball engagement groove 13B having the Gothic arch shape as illustrated in FIGS. 19A and 19B, or the ball engagement groove 16 is the ball engagement groove 16B having the Gothic arch shape illustrated in FIG. 20A and FIG. 20B, the ball can stably be arranged in position, and a synchronous rotation characteristic (constant velocity characteristic) can be improved. Therefore, a speed changer having excellent durability and high quality can be provided.

Figure 21:
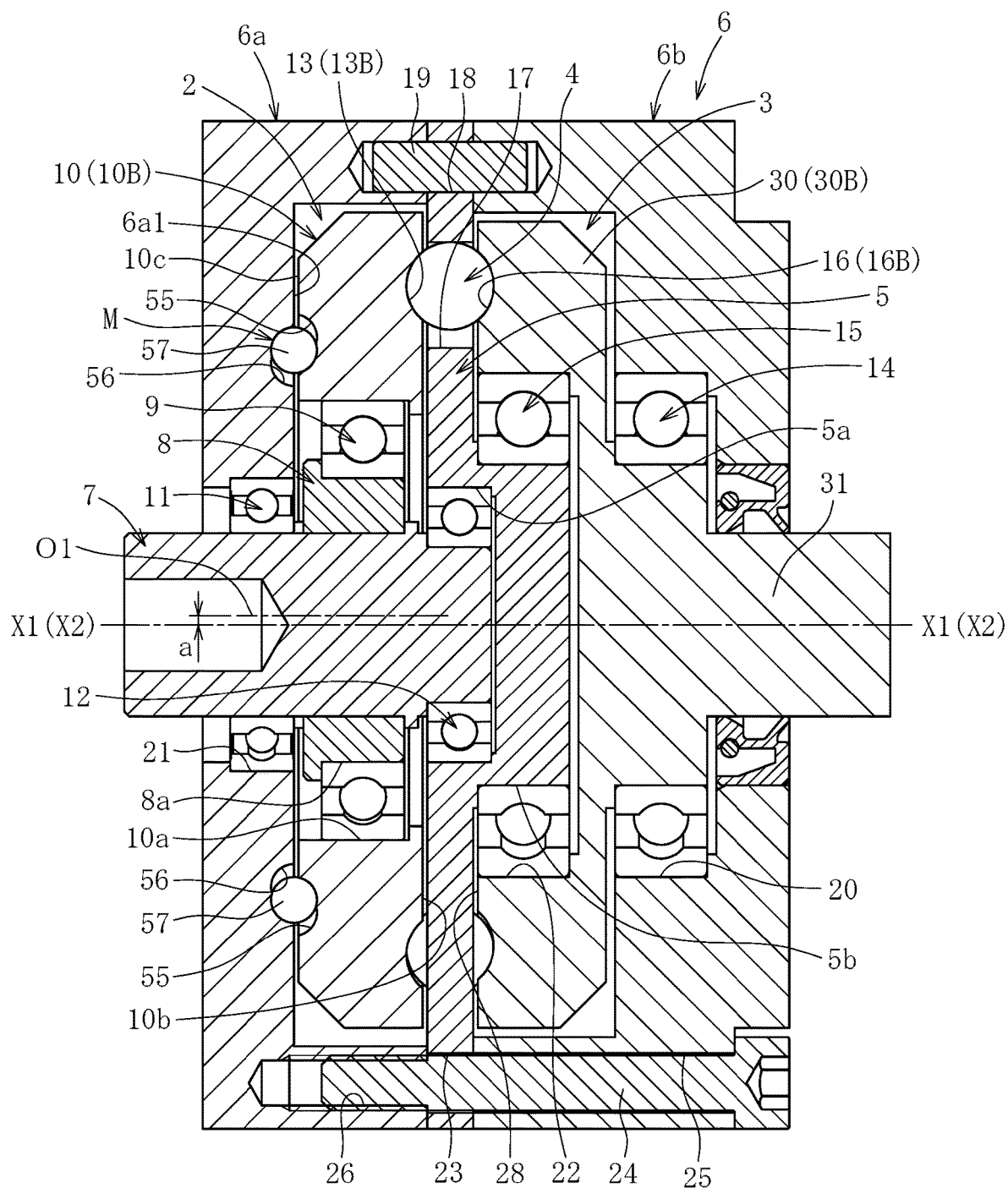
FIG. 21 is a sectional view for illustrating a speed reducer comprising a rotation restriction mechanism.
Figure 22:
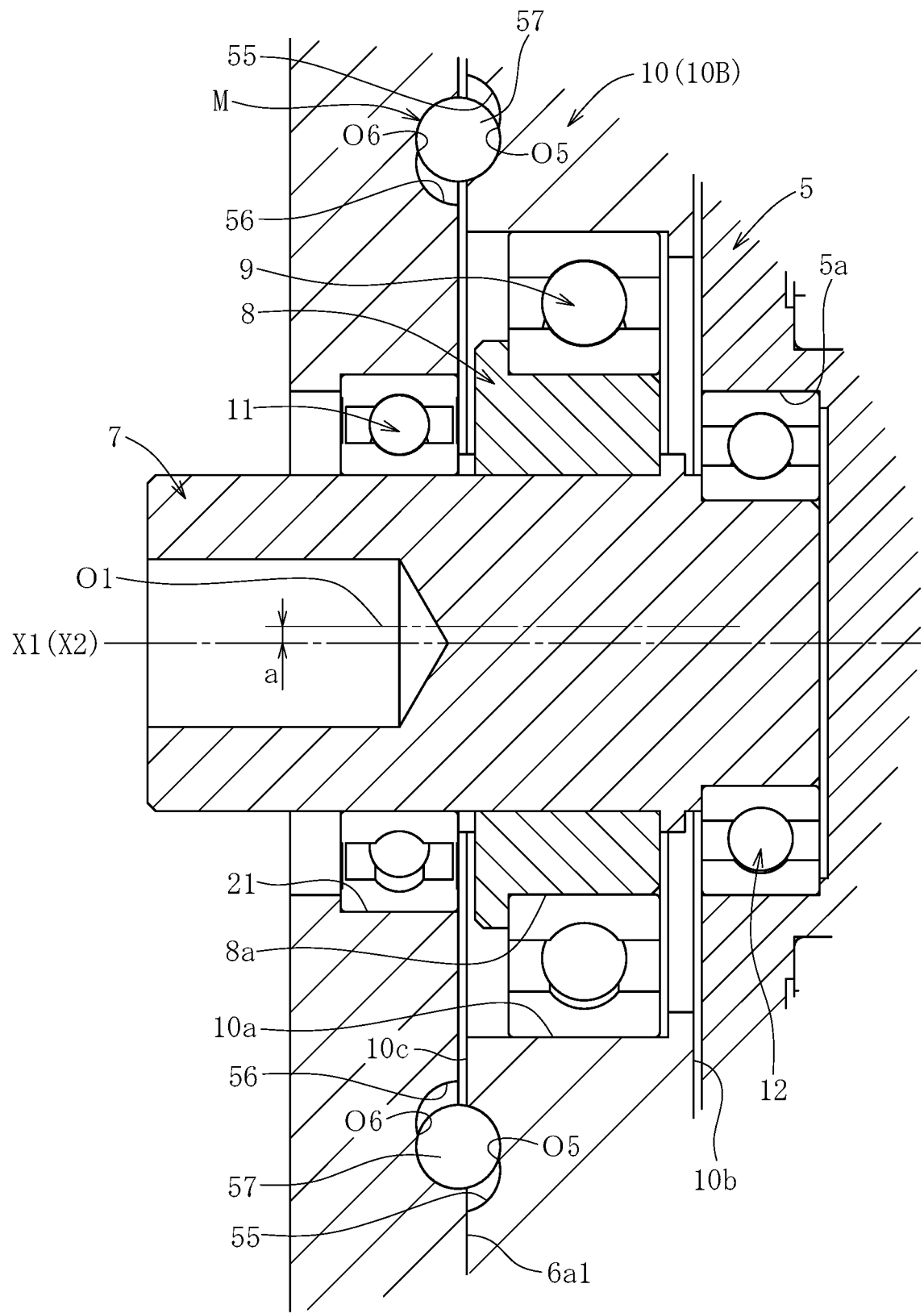
FIG. 22 is an enlarged sectional view for illustrating a main part of the speed reducer illustrated in FIG. 21.

Incidentally, when the groove 13 of the input plate 10 is formed into the polygonal shape, it is preferred to restrict the rotation of the input plate 10 and to permit only the revolution of the input plate 10 in order to maintain a relative positional relationship characteristic between the groove 13 of the input plate 10 and the oblong holes (pockets) 17 of the retainer. Therefore, as illustrated in FIG. 21 and FIG. 22, it is preferred to provide a rotation restriction mechanism M configured to restrict the rotation of the input plate 10 and permit a revolution of the input plate 10, between the input plate 10 and a wall surface (in this case, an inner side surface 6a1 of a side wall on the input side of the case 6) on a fixed side opposed to the input plate 10.

Figure 23:
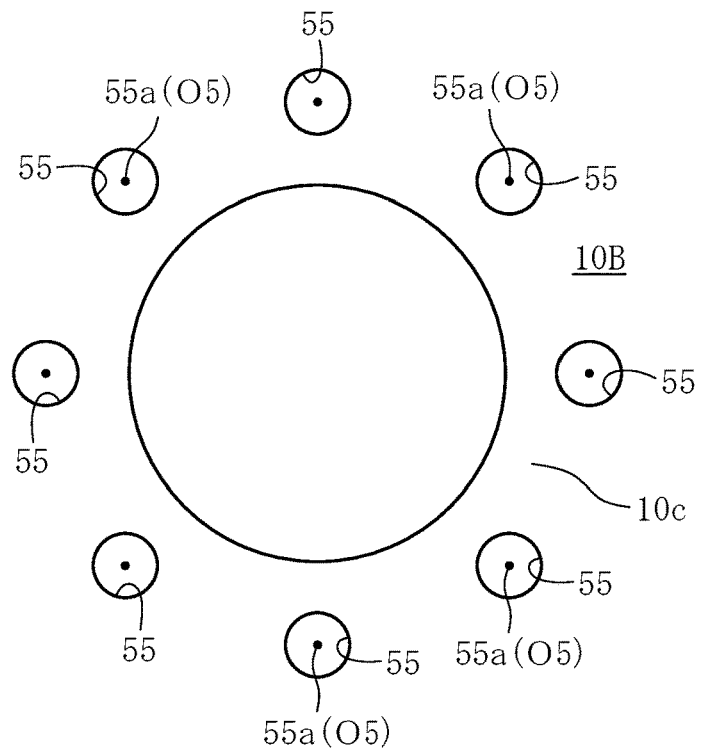
FIG. 23 is a schematic view for illustrating a main part seen from an input side of the input plate of the speed reducer illustrated in FIG. 21.
Figure 24:
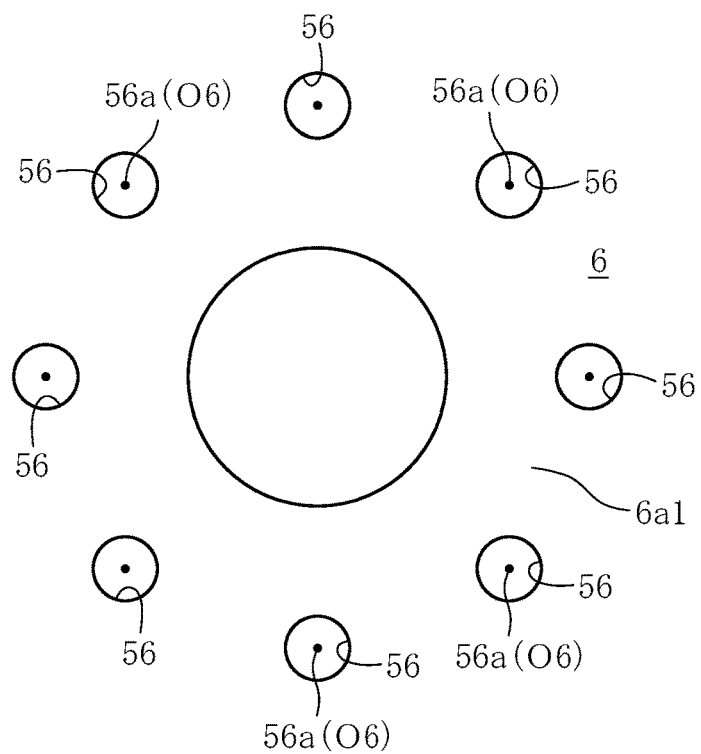
FIG. 24 is a schematic view for illustrating a main part seen from an output side of a side wall on an input side of a case of the speed reducer illustrated in FIG. 21.

The rotation restriction mechanism M comprises a plurality (in this embodiment, as illustrated in FIG. 23, eight at a pitch of 45°) of annular raceway grooves 55, a plurality (in this embodiment, as illustrated in FIG. 24, eight at a pitch of) 45° of annular raceway grooves 56, and rolling elements 57. The raceway grooves 55 are formed at a predetermined pitch in the circumferential direction in a side surface 10c on the input side of the input plate 10B. The raceway grooves 56 are formed at the predetermined pitch in the circumferential direction in the inner side surface 6a1 of the first member 6a of the case 6 opposed to the side surface 10c on the input side of the input plate 10B. Each of the rolling elements 57 is interposed between the raceway groove 55 and the raceway groove 56 opposed to the raceway groove 55. In this case, an annular center O5 of the raceway groove 55 and an annular center O6 of the raceway groove 56 are eccentric from each other. In this state, it is preferred that the annular center O5 of the raceway groove 55 and the annular center O6 of the raceway groove 56 are eccentric toward directions opposite to each other by 180°. Crests 55a and 56a are formed at centers of the raceway grooves 55 and the raceway groove 56. Axial centers of the crests 55a and 56a correspond to the annular centers O5 and O6, respectively.

When such a rotation restriction mechanism M is provided, the rotation of the input plate 10 is restricted and the revolution of the input plate 10 is permitted. Therefore, a relative positional relationship between the groove 13 of the input plate 10 and the oblong holes (pockets) 17 in the retainer 5 can be maintained, thereby stably preventing the vibration occurrence. The number of the raceway grooves 55 (56) of the rotation restriction mechanism M may be optionally increased and decreased.

Description has been made of the embodiments of the present invention. However, the present invention is not limited to the embodiments, and can be modified in various ways. In the speed reducer according to the first embodiment, the input plate 10 (10A and 10B) is configured to freely rotate with respect to the eccentric cam 8 provided on the rotary shaft 7. However, the input plate 10 and the rotary shaft 7 may be integrated with each other. Moreover, in the speed reducer 1 according to the second embodiment, such a configuration that the independent eccentric cam 8 is fitted to the rotary shaft 7 is exemplified. However, the configuration is not limited to this example, and the rotary shaft and the eccentric cam may be integrated with each other. Further, the axial center of the input plate 10 may be concentric with the rotary shaft 7 being the input shaft, and a curvature center of the first ball engagement groove 13 may be eccentric by a predetermined amount with respect to the axial center of the input plate 10. That is, the ball engagement groove 13 having a curvature center eccentric with respect to the axial center of the rotary shaft 7 may be formed without providing the eccentric portion on the rotary shaft 7. Therefore, a degree of freedom in design is increased for such a configuration that the curvature center of the first ball engagement groove 13 is eccentric by the predetermined amount with respect to the speed-reducer rotation center X, and ease of design for the speed reducer can be improved.

In the speed reducer 1 according to the embodiments, the speed reducer having the speed reduction ratio "i" of $-\frac{1}{10}$ is exemplified. However, for example, the speed reduction ratio "i" can appropriately be set approximately to $\frac{1}{5}$ to $\frac{1}{20}$ in accordance with necessity. In this case, the number of the chests and troughs of the wave-shaped curve of the raceway center line of the ball engagement groove, the number of the pockets of the retainer, and the number of the balls only need to appropriately be set in accordance with the speed reduction ratio "i".

When the ball engagement groove is formed into the Gothic arch shape, any one of the first ball engagement groove 13A and the second ball engagement groove 16A or any one of the first ball engagement groove 13B and the second ball engagement groove 16B may be formed into the Gothic arch shape.

INDUSTRIAL APPLICABILITY

A drive source configured to input a drive force to the input shaft may be a motor or other drive source such as an engine.

REFERENCE SIGNS LIST 2 input-side rotary member
3 output-side rotary member
30 output plate
4 ball
5 retainer
6 case
8 eccentric cam
9 bearing
10 input plate
13 first ball engagement groove
14 bearing
15 bearing
16 second ball engagement groove
17 pocket
M rotation restriction mechanism

The invention claimed is:

1. A speed reducer, comprising:
an input-side rotary member comprising an input plate portion having a first ball engagement groove;
an output-side rotary member, which is arranged coaxially with a rotary shaft of the input-side rotary member, and comprises an output plate portion having a second ball engagement groove;
a plurality of balls, which engage with both of the ball engagement grooves of the input plate portion and the output plate portion opposed to each other in an axial direction; and
a retainer comprising a plurality of pockets configured to hold the balls so that the balls are movable in a radial direction,
wherein the retainer is provided so as to be prevented from being rotatable with respect to the rotary shaft,
wherein rotation of the input-side rotary member is reduced in speed and transmitted to the output-side rotary member through intermediation of the balls which engage with both of the ball engagement grooves, wherein a raceway center line of the second ball engagement groove is formed of a wave-shaped curve, and wherein, when a speed reduction ratio of the speed reducer is represented by "i", the wave-shaped curve has such a shape that the balls which engage with the first ball engagement groove engage with the second ball engagement groove at a given rotation angle θ of the input-side rotary member in a state in which the output-side rotary member is at a rotation angle iθ.

2. The speed reducer according to claim 1, wherein centers of the balls which engage with the first ball engagement groove are positioned on the raceway center line of the second ball engagement groove.

3. The speed reducer according to claim 1, wherein the first ball engagement groove of the input plate comprises a circular groove having a center eccentric by a predetermined amount with respect to a speed-reducer rotation axis.

4. The speed reducer according to claim 1, wherein the input plate is mounted so as to be rotatable on an eccentric portion, which is formed on the rotary shaft being an input shaft, through intermediation of a bearing, and a curvature center of the first ball engagement groove is eccentric by a predetermined amount with respect to speed-reducer rotation axis.

5. The speed reducer according to claim 1, wherein an axial center of the input plate is concentric with the rotary shaft being an input shaft, and a curvature center of the first ball engagement groove is eccentric by a predetermined amount with respect to the axial center of the input plate.

6. The speed reducer according to claim 1, wherein, when the number of the balls is represented by "n", the number of peaks of the wave-shaped groove of the output plate is represented by "N", and the speed reduction ratio is represented by "i", i=(N−n)/N is satisfied.

7. The speed reducer according to claim 1, wherein, when an eccentric amount of the first ball engagement groove is represented by "a", a pitch circle radius of centers of the pockets is represented by "r", a rotation angle of the output plate is represented by w, and a speed reduction ratio is represented by "i", a center path of the wave-shaped groove of the output plate is represented by a distance R from the speed-reducer rotation axis, and the distance R satisfies the following Expression 1:

$$R = a \cdot \cos(\psi/i) + \sqrt{r^2 (a \cdot \sin(\psi/i))^2}$$ [Expression 1]

R: distance between axial center of rotary shaft and raceway center line of second ball engagement groove
a: eccentric amount
i: speed reduction ratio
ψ: rotation angle of output plate
r: radius of raceway center line of first ball engagement groove.

8. The speed reducer according to claim 1, wherein a groove shape of the input plate comprises a polygonal cylindrical shape having as many sides as the number of the balls, wherein a groove shape of the output shaft comprises a wave-shaped groove that rotates while a rotation angle of the output plate always maintains a speed reduction ratio to a rotation angle of the input plate, and wherein, when a rotation angle of the input plate is represented by θ, a rotation angle of the output plate is represented by w, and a speed reduction ratio is represented by "i", i=ψ/θ is satisfied.

9. The speed reducer according to claim 8, wherein, when an eccentric amount of the first ball engagement groove is represented by "a", a pitch circle radius of centers of the pockets is "r", a rotation angle of the output plate is represented by "ψ", and a speed reduction ratio is represented by "i", a center path of the wave-shaped groove of the output plate is represented by a distance R from the speed-reducer rotation axis, and the distance R satisfies the following Expression 2:

$$R = a \cdot \cos(\psi/i) + r$$ [Expression 2]

R: distance between rotation center shaft (speed-reducer rotation axis) and balls
a: offset amount (eccentric amount) of center axis of input plate
r: pitch circle radius
ψ: rotation angle of output plate
i: speed reduction ratio.

10. The speed reducer according to claim 1, wherein at least one of a groove shape of the first ball engagement groove and a groove shape of the second ball engagement groove comprises a Gothic arch shape.

11. The speed reducer according to claim 1, further comprising a case configured to rotatably accommodate the input plate and the output plate and fix the retainer, wherein the input plate is externally fitted to the input shaft through a bearing, and wherein the output plate is integrated with an output shaft axially supported by the case through intermediation of a bearing so as to be rotatable.

12. The speed reducer according to claim 1, wherein a rotation restriction mechanism configured to restrict rotation of the input plate and permit revolution of the input shaft is provided between the input plate and a wall surface on a fixed side opposed to the input plate.

* * * * *